United States Patent
Tan et al.

(10) Patent No.: US 12,327,564 B1
(45) Date of Patent: Jun. 10, 2025

(54) VOICE-BASED USER RECOGNITION

(71) Applicant: Amazon Technologies, Inc., Seattle, WA (US)

(72) Inventors: Zhenning Tan, Union City, CA (US); Eunjung Han, Los Altos, CA (US); Ruirui Li, Sunnyvale, CA (US); Hongda Mao, Fremont, CA (US); Yuguang Yang, Charlotte, NC (US); Oguz Hasan Elibol, Sunnyvale, CA (US); Itay Teller, Sunnyvale, CA (US); Mohamed G Mahmoud, Santa Clara, CA (US); Andreas Stolcke, Alameda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 17/488,520

(22) Filed: Sep. 29, 2021

Related U.S. Application Data

(60) Provisional application No. 63/241,075, filed on Sep. 6, 2021.

(51) Int. Cl.
*G10L 17/04* (2013.01)
*G10L 17/02* (2013.01)
(Continued)

(52) U.S. Cl.
CPC .............. *G10L 17/06* (2013.01); *G10L 17/04* (2013.01); *G10L 17/18* (2013.01); *G10L 17/22* (2013.01); *G10L 17/02* (2013.01)

(58) Field of Classification Search
CPC .......... G06F 21/00; G06F 21/30; G06F 21/31; G06F 21/32; G07C 9/37; G10L 17/06;
(Continued)

(56) References Cited

U.S. PATENT DOCUMENTS 6,341,264 B1 * 1/2002 Kuhn ..................... G06Q 30/06
715/201
11,257,503 B1 * 2/2022 Lakkavalli .............. G10L 17/18
(Continued)

FOREIGN PATENT DOCUMENTS

WO WO-2019145708 A1 * 8/2019 ............... G06F 1/32

OTHER PUBLICATIONS

N. Dehak, P. J. Kenny, R. Dehak, P. Dumouchel, and P. Ouellet, "Front-end factor analysis for speaker verification," IEEE Transactions on Audio, Speech, and Language Processing, vol. 19, No. 4, pp. 788-798, 2010.
(Continued)

*Primary Examiner* — Thierry L Pham
(74) *Attorney, Agent, or Firm* — Pierce Atwood LLP

(57) ABSTRACT

Techniques for performing voice-based user recognition are described. When a device receives audio data corresponding to a spoken user input, the device may generate spoken user input embedding data representing speech characteristics of the spoken user input. The device may also identify user embedding data representing speech characteristics of a user known to the device. A machine learning (ML) model may process the spoken user input embedding data to generate reduced spoken user input embedding data including a reduced number of dimensions, where the reduced number of dimensions are functions of the higher number of dimensions of the spoken user input embedding data. Moreover, the ML model may process the user embedding data to generate reduced user embedding data including a reduced number of dimensions, where the reduced number of dimensions are functions of the higher number of dimensions of the user embedding data and are tuned to characteristics of users of the device (as opposed to a representation of all possible users). A comparison of the reduced spoken user
(Continued)

input embedding data and the reduced user embedding data may be used to determine whether the user spoke the user input.

22 Claims, 10 Drawing Sheets

(51) Int. Cl.
*G10L 17/06* (2013.01)
*G10L 17/18* (2013.01)
*G10L 17/22* (2013.01)

(58) Field of Classification Search
CPC ......... G10L 17/04; G10L 17/18; G10L 17/22; G10L 17/02
USPC ....................................................... 704/232
See application file for complete search history.

(56) References Cited

U.S. PATENT DOCUMENTS

| | | | |
|---|---|---|---|
| 2013/0253931 A1* | 9/2013 | Shen ........................ | G10L 17/04 704/243 |
| 2014/0222428 A1* | 8/2014 | Cumani ................... | G10L 17/02 704/250 |
| 2015/0356974 A1* | 12/2015 | Tani ......................... | G10L 17/06 704/239 |
| 2018/0082691 A1* | 3/2018 | Khoury .................... | G10L 17/04 |
| 2019/0311098 A1* | 10/2019 | Baldwin ................. | G06N 3/045 |
| 2020/0194006 A1* | 6/2020 | Grancharov ............ | G06F 17/18 |
| 2020/0365160 A1* | 11/2020 | Nassar .................... | G10L 15/26 |
| 2021/0280171 A1* | 9/2021 | Phatak .................... | G06N 3/045 |
| 2023/0048264 A1* | 2/2023 | Hoste .................. | H04M 7/0078 |

OTHER PUBLICATIONS

G. Heigold, I. Moreno, S. Bengio, and N. Shazeer, "End-to-end text-dependent speaker verification," in 2016 IEEE International Conference on Acoustics, Speech and Signal Processing (ICASSP). IEEE, 2016, pp. 5115-5119.

L. Wan, Q. Wang, A. Papir, and I. L. Moreno, "Generalized end-to-end loss for speaker verification," in Proc. IEEE ICASSP, 2018, pp. 4879-4883.

J. S. Chung, A. Nagrani, and A. Zisserman, "Voxceleb2: Deep speaker recognition," arXiv preprint arXiv:1806.05622, 2018.

D. Snyder, D. Garcia-Romero, G. Sell, D. Povey, and S. Khudanpur, "X-vectors: Robust DNN embeddings for speaker recognition," in Proc. IEEE ICASSP, 2018, pp. 5329-5333.

C. Li, X. Ma, B. Jiang, X. Li, X. Zhang, X. Liu, Y. Cao, A. Kannan, and Z. Zhu, "Deep speaker: an end-to-end neural speaker embedding system," arXiv preprint arXiv:1705.02304, vol. 650, 2017.

D. Garcia-Romero, G. Sell, and A. McCree, "Magneto: X-vector magnitude estimation network plus offset for improved speaker recognition," in Proc. Odyssey 2020 The Speaker and Language Recognition Workshop, 2020, pp. 1-8.

B. Desplanques, J. Thienpondt, and K. Demuynck, "ECAPA-TDNN: Emphasized channel attention, propagation and aggregation in TDNN based speaker verification," arXiv preprint arXiv:2005.07143, 2020.

S. J. Prince and J. H. Elder, "Probabilistic linear discriminant analysis for inferences about identity," in 2007 IEEE 11th International Conference on Computer Vision. IEEE, 2007, pp. 1-8.

P. Kenny, "Bayesian speaker verification with heavy tailed priors." in Odyssey, vol. 14, 2010.

L. Ferrer and M. McLaren, "A speaker verification backend for improved calibration performance across varying conditions," arXiv preprint arXiv:2002.03802, 2020.

J. Pelecanos, Q. Wang, and I. L. Moreno, "Dr-vectors: Decision residual networks and an improved loss for speaker recognition," arXiv preprint arXiv:2104.01989, 2021.

H.-J. Ye, H. Hu, D.-C. Zhan, and F. Sha, "Few-shot learning via embedding adaptation with set-to-set functions," in Proceedings of the IEEE/CVF Conference on Computer Vision and Pattern Recognition, 2020, pp. 8808-8817.

J. Konenčný, H. B. McMahan, F. X. Yu, P. Richtárik, A. T. Suresh, and D. Bacon, "Federated learning: Strategies for improving communication efficiency," arXiv preprint arXiv:1610.05492, 2016.

A. Nagrani, J. S. Chung, and A. Zisserman, "Voxceleb: a large-scale speaker identification dataset," arXiv preprint arXiv:1706.08612, 2017.

J. S. Chung, J. Huh, S. Mun, M. Lee, H. S. Heo, S. Choe, C. Ham, S. Jung, B.-J. Lee, and I. Han, "In defence of metric learning for speaker recognition," arXiv preprint arXiv:2003.11982, 2020.

H. S. Heo, B.-J. Lee, J. Huh, and J. S. Chung, "Clova baseline system for the voxceleb speaker recognition challenge 2020," arXiv preprint arXiv:2009.14153, 2020.

H. Wang, Y. Wang, Z. Zhou, X. Ji, D. Gong, J. Zhou, Z. Li, and W. Liu, "Cosface: Large margin cosine loss for deep face recognition," in Proceedings of the IEEE conference on computer vision and pattern recognition, 2018, pp. 5265-5274.

R. Li, J.-Y. Jiang, X. Wu, C.-C. Hsieh, and A. Stolcke, "Speaker Identification for Household Scenarios with Self-Attention and Adversarial Training," in Proc. Interspeech 2020, 2020, pp. 2272-2276. [Online]. Available: http://dx.doi.org/10.21437/Interspeech.2020-3025.

J. Fortuna, P. Sivakumaran, A. Ariyaeeinia, and A. Malegaonkar, "Open-set Speaker Identification Using Adapted Gaussian Mixture Models," in Ninth European Conference on Speech Communication and Technology, 2005.

P. Angkititrakul and J. H. Hansen, "Discriminative inset/out-of-set speaker recognition," IEEE Transactions on Audio, Speech, and Language Processing, vol. 15, No. 2, pp. 498-508, 2007.

K. Wilkinghoff, "On open-set speaker identification with ivectors," in The Speaker and Language Recognition Workshop (Odyssey). ISCA, 2020, pp. 408-414.

D. Snyder, D. Garcia-Romero, D. Povey, and S. Khudanpur, "Deep neural network embeddings for text-independent speaker verification." in Interspeech, 2017, pp. 999-1003.

S. Ioffe, "Probabilistic linear discriminant analysis," in European Conference on Computer Vision. Springer, 2006, pp. 531-542.

S. Shum, N. Dehak, E. Chuangsuwanich, D. Reynolds, and J. Glass, "Exploiting intra-conversation variability for speaker diarization," in Twelfth Annual Conference of the International Speech Communication Association, 2011.

D. Berthelot, N. Carlini, I. Goodfellow, N. Papernot, A. Oliver, and C. Raffel, "Mixmatch: A holistic approach to semi-supervised learning," arXiv preprint arXiv:1905.02249, 2019.

Q. Xie, Z. Dai, E. Hovy, M.-T. Luong, and Q. V. Le, "Unsupervised data augmentation for consistency training," arXiv preprint arXiv:1904.12848, 2019.

L. Chen, V. Ravichandran, and A. Stolcke, "Graph-based label propagation for semi-supervised speaker identification," arXiv preprint arXiv:2106.08207, 2021.

D.-H. Lee et al., "Pseudo-label: The simple and efficient semi-supervised learning method for deep neural networks," in Workshop on challenges in representation learning, ICML, vol. 3, No. 2, 2013.

H. Pham, Z. Dai, Q. Xie, and Q. V. Le, "Meta pseudo labels," in Proceedings of the IEEE/CVF Conference on Computer Vision and Pattern Recognition, 2021, pp. 11 557-11 568.

T. Wang and P. Isola, "Understanding contrastive representation learning through alignment and uniformity on the hypersphere," in International Conference on Machine Learning. PMLR, 2020, pp. 9929-9939.

\* cited by examiner

VOICE-BASED USER RECOGNITION

CROSS-REFERENCE TO RELATED APPLICATION

This application claims the benefit of priority of U.S. Provisional Patent Application No. 63/241,075, filed Sep. 6, 2021, and titled "VOICE-BASED USER RECOGNITION," the contents of which are expressly incorporated herein by reference in their entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
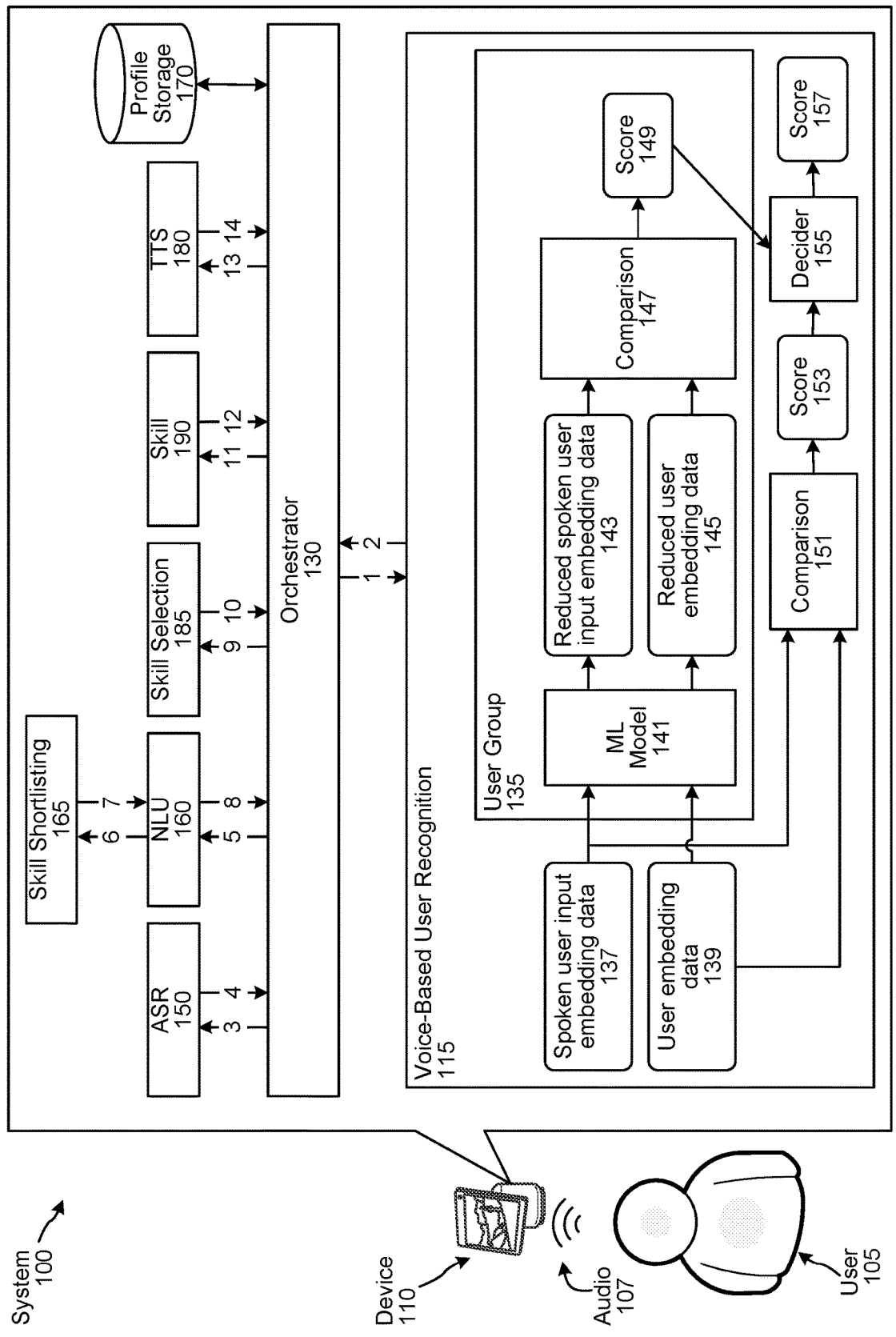
FIG. 1A is a conceptual diagram illustrating a system configured to perform voice-based user recognition processing, where all processing of a user input is performed on-device, according to embodiments of the present disclosure.

Automatic speech recognition (ASR) is a field of computer science, artificial intelligence, and linguistics concerned with transforming audio data associated with speech into text, a token, or other representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

Voice-controlled devices allow users to interact with devices using speech. While personal devices, like smartphones, may primarily be operated by a single user, other devices, like smart speakers, smart TVs, etc., may be used by multiple users. For such "communal" devices, high-accuracy voice-based user recognition is important to distinguish among the multiple users, as recognizing a user enables for a personalized experience (e.g., playing a user's preferred music, etc.) and/or authorized access to certain functionalities (e.g., access to secured services, such as payment for shopping, access to personal email, etc.).

Voice-based user recognition may involve three stages. A device may receive audio data corresponding to a runtime spoken input from a user. In a first stage, an embedding extraction front-end may use an encoder to compute spoken user input level embedding data from the received audio data. The embedding extraction front-end may use ivector, d-vector, x-vector, or other methods for generating spoken user input embeddings.

Prior to the first stage, user embedding data (representing how a particular user speaks) may be computed from multiple spoken user inputs, such as utterances in response to system generated enrollment-specific prompts that the user is requested to speak during a voice-based user recognition enrollment process. The embeddings, generated from the enrollment or other spoken inputs, may be normalized and averaged to generate the user embedding data for the particular user. When there are multiple users that may interact with the same device, the profile creation process may involve generating and storing respective user embedding data for each of the users.

In a second stage (subsequent to the first stage referenced in the preceding paragraphs), the spoken user input embedding data (computed in the first stage above and corresponding to the runtime spoken user input) may be compared (using a scoring function, sometimes referred to as a scoring back-end) to each user embedding data associated with the device. The scoring function can be based on cosine similarity, probabilistic linear discriminant analysis (PLDA) and its variants, or a neural network (e.g., a deep neural network, etc.).

In a third, final stage, the highest matching score (e.g., nearest neighbor) may be compared against a predefined threshold and, if the highest matching score is higher than the predefined threshold, the user associated with the highest matching user embedding may be recognized as the speaker of the runtime spoken user input. If the highest matching score is not higher than the predefined threshold, then it may be determined that the runtime spoken user input originated from a user (e.g., a guest) not having a profile explicitly associated with the device or otherwise used in the processing of the input audio.

The present disclosure provides a voice-based user recognition technique including a lightweight, scalable user group-adapted (e.g., household user-adapted, business employee-adapted, etc.) back-end scoring model that is capable of learning low-dimensional embeddings optimized for the user group. The voice-based user recognition technique of the present disclosure is configured to focus on features important in distinguishing users of a group (e.g., users of a household, employees of a business, etc.), rather than using a large number of features for distinguishing between all users of a system.

In some embodiments, the voice-based user recognition technique may use a small neural network to extract user group-specific low-dimensional features from high-dimensional embedding data. Thereafter, local comparison scores may be computed from the low-dimensional features, and the local scores may be fused with global scores based on comparison of the high-dimensional embedding data to obtain final scores.

Techniques of the present disclosure, are also beneficial when implemented on-device, where all voice-based user recognition tasks (i.e., data acquisition, training, and inference) are completed on the device without sending personal data to a server. Nonetheless, the parameters of the ML model of the present disclosure could be sent to the server to further improve a global model using federated learning techniques.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A shows a system 100 configured to perform voice-based user recognition processing using a user group-specific voice-based user recognition architecture, where all processing of a user input is performed on-device. Although the figures and discussion of the present disclosure illustrate certain steps in a particular order, the steps described may be performed in a different order (as well as certain steps removed or added) without departing from the present disclosure.

As shown in FIG. 1A, a device 110 (local to a user 105) may include various components for processing a spoken user input. As shown in FIG. 1A, such components may include, but are not limited to, an orchestrator component 130, a voice-based user recognition component 115, an ASR component 150, a NLU component 160, a skill shortlisting component 165, a skill component selection component 185, a skill component 190, and a TTS component 180. As illustrated, the device 110 may also include a profile storage 170 storing user and/or group profile data for use by one or more components of the device 110.

The user 105 may speak an input, and the device 110 may capture audio 107 representing the spoken input. The device 110 may generate input audio data corresponding to the audio 107. The orchestrator component 130 may send (step 1) the input audio data to the voice-based user recognition component 115.

Figure 3A:
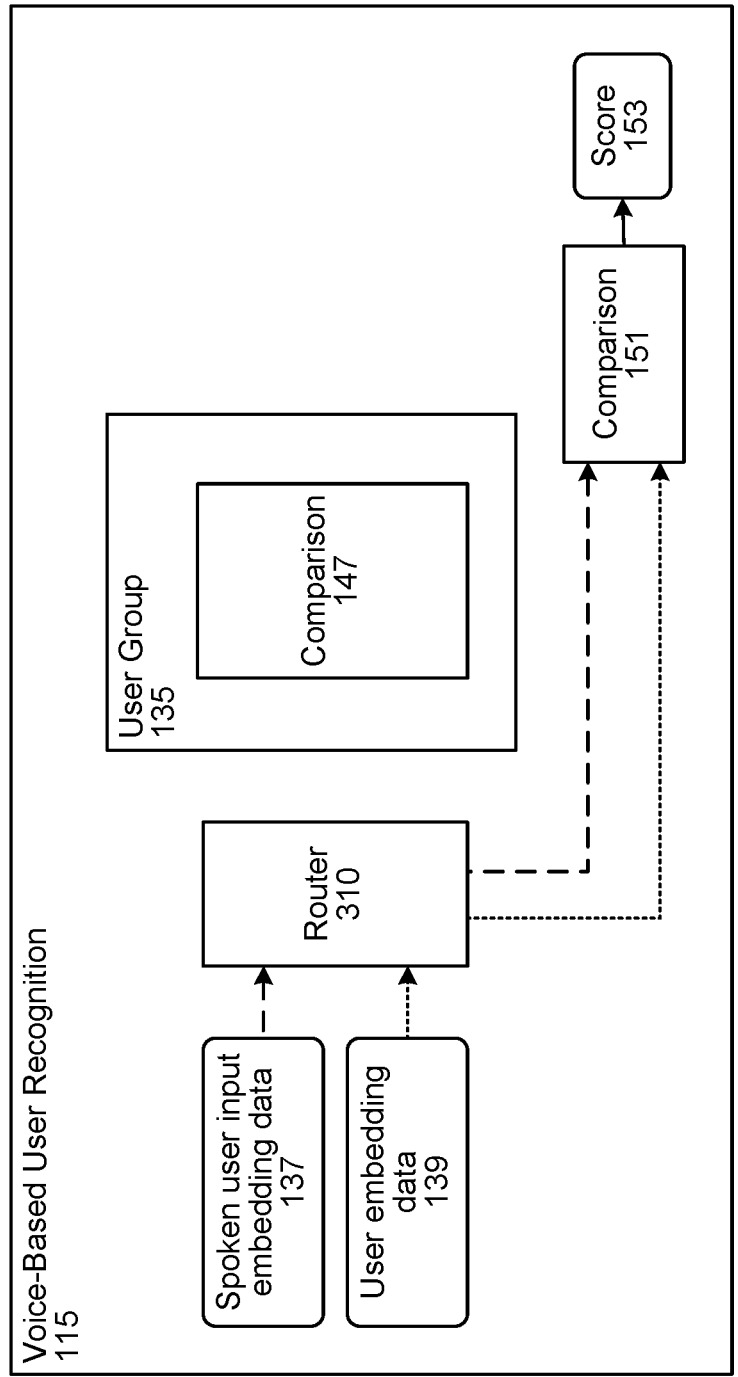
FIGS. 3A-3C are conceptual diagrams illustrating example configurations of the voice-based user recognition component, according to embodiments of the present disclosure.
Figure 3B:
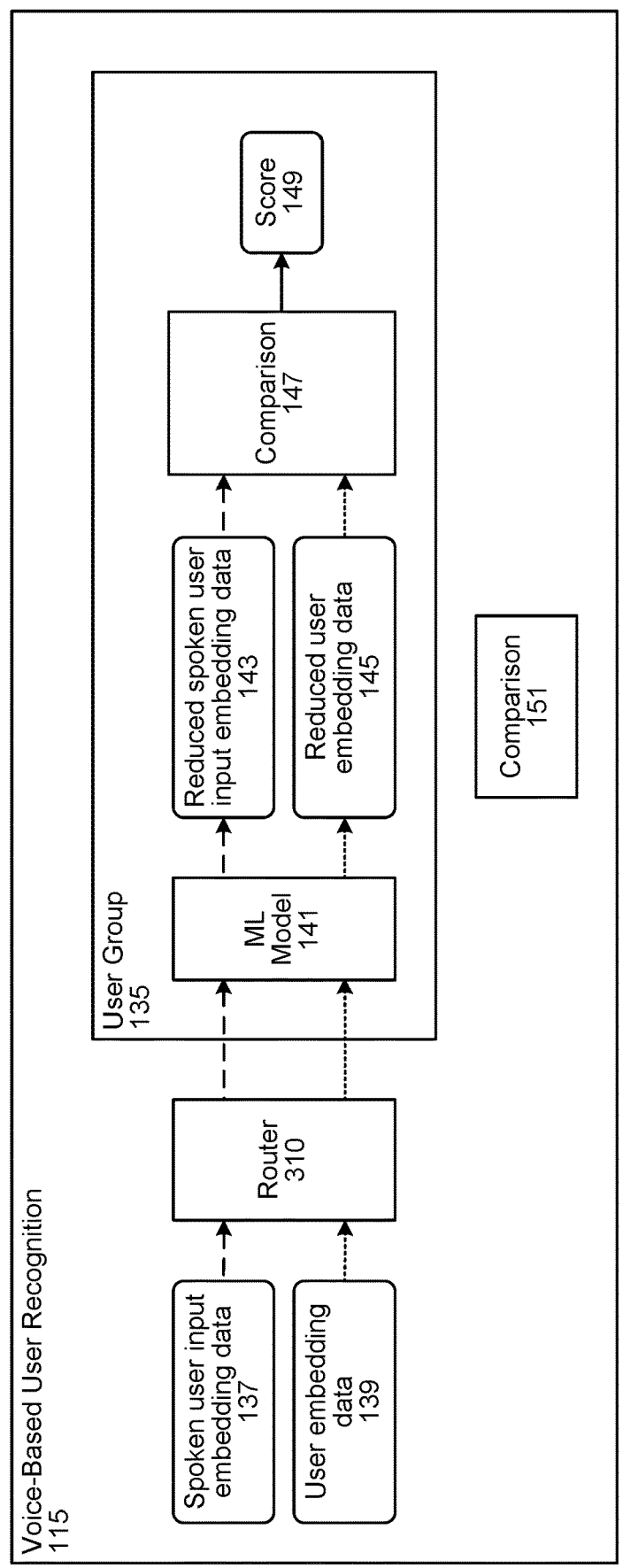
Figure 3C:
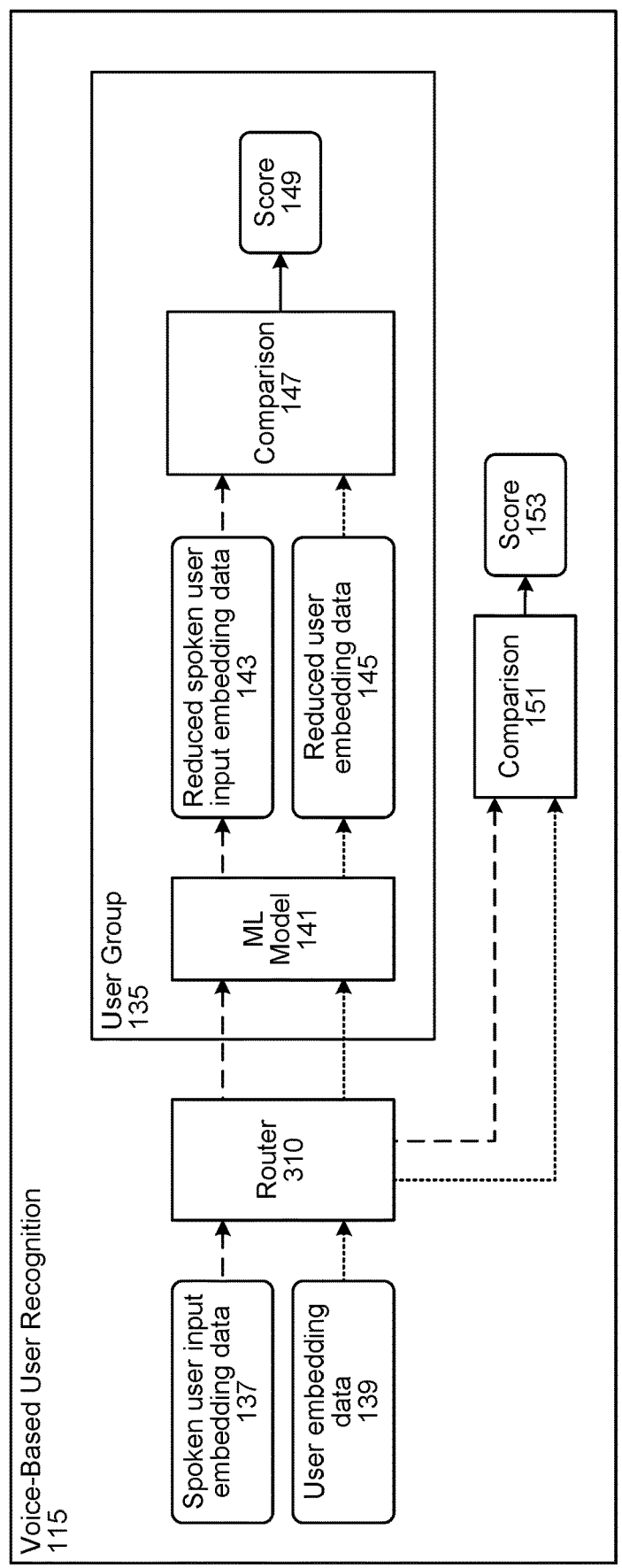

The voice-based user recognition component 115 performs voice-based user recognition processing to determine an identity of the user 105 that spoke the user input. In some embodiments, the voice-based user recognition component 115 may include a user group component 135, a comparison component 151, and a decider component 155. However, as illustrated in FIGS. 3A-3C, alternative configurations of the voice-based user recognition component 115 are within the scope of the present disclosure.

The voice-based user recognition component 115 may communicate with or include a user embedding storage (not illustrated). The user embedding storage may store a plurality of user embedding data, where each instance of user embedding data represents speech characteristics of a user known to the device 110 (e.g., a known user of a household in which the device 110 is located, a known employee of a business in which the device 110 is located, etc.).

The device 110 may generate user embedding data, corresponding to a particular user, in response to the user performing a voice-based user recognition enrollment process with the device 110. During the enrollment process, the device 110 may request a user speak a plurality of particular user inputs. The device 110 captures audio of each requested spoken user input, generates (using an encoder) spoken user input embedding data for each of the captured requested spoken user inputs, and generates user embedding data using the various spoken user input embedding data. In some embodiments, the user embedding data may be generated as an average of the various spoken user input embedding data.

In some embodiments, the device 110 may be associated with a group profile identifier (e.g., a household identifier, a business identifier, or some other identifier corresponding to a plurality of users), and the group profile identifier may be associated with one or more other devices corresponding to the group (e.g., located in the same house as the device 110, located at the same business as the device 110, etc.). In some instances, a user may perform the voice-based user recognition enrollment process with one of the other devices associated with the same group profile identifier as the device 110, and the other device (or a system 120 illustrated in FIG. 1B) may generate user embedding data based on the enrollment processing being performed. In this example, since more than one device is associated with the group profile identifier, the user embedding data may be sent to and stored by each device (including the device 110) associated with the group profile identifier. Thus, in some situations the device 110 receive, rather than generate, user embedding data. But, in any event, the device 110 may include the user embedding storage storing user embedding data for each user that performed the voice-based user recognition enrollment process via a device associated with the group profile identifier.

In some instances, the user embedding storage may store user embedding data corresponding to a user that is temporarily associated with the device 110. Such a user may be referred to as a "guest user." For example, a guest user may visit a household, business, etc. for a length of time, and may want responses, to the guest user's spoken user inputs, to be personalized to the guest user (e.g., if the guest user says "play music," the guest user may want the device 110 to output a music playlist associated with the guest user, and not a generic music playlist associated with the household, business, etc.). To facilitate such personalized processing, the guest user may associate its user profile with the device 110 (or a group user profile associated with the device 110). As a result, the guest user's user embedding data may be stored in the user embedding storage of the device 110 while the guest user's profile is associated with the device 110 or corresponding group user profile. Once the guest user causes its user profile to no longer be associated with the device or corresponding group user profile, the guest user's user embedding data may be deleted from the user embedding storage of the device 110.

In response to receiving the input audio data of the current spoken user input at step 1, the voice-based user recognition component 115 may process the input audio data using an encoder (not illustrated) to generate spoken user input embedding data 137, a vector representing speech characteristics corresponding to the input audio data. The present disclosure is not limited to any particular encoder, as various encoders may generate spoken user input embedding data 137 representing speech characteristics of the current spoken user input.

Moreover, in response to receiving the input audio data at step 1, and before or after generating the spoken user input embedding data 137, the voice-based user recognition component 115 may identify an instance of user embedding data 139 stored in the user embedding storage of the device 110, where the user embedding data 139 is a vector representing speech characteristics of the user. The spoken user input embedding data 137 and the user embedding data 139 may each be high-dimensional embedding data. For example, in some embodiments the spoken user input embedding data 137 may be a vector of 512 dimensions, and the user embedding data 139 may be a vector of 512 dimensions. As used herein, a "dimension" may refer to an independent numerical value used to represent one or more properties (e.g., speech characteristics, environmental noise, etc.) present in corresponding audio data. As used herein, "dimensions" may refer to independent numerical values used to represent properties (e.g., speech characteristics, environmental noise, etc.) present in corresponding audio data.

The voice-based user recognition component 115 sends the spoken user input embedding data 137 and the user embedding data 139 to the user group component 135.

The user group component 135 may implement a machine learning (ML) model 141 configured to project the spoken user input embedding data 137 and the user embedding data 139 to a lower dimensional space. The user group component 135 may be configured to reduce the size of the high dimension spoken user input embedding data 137 and high dimension user embedding data 139. For example, when the spoken user input embedding data 137 and the user embedding data 139 are each 512 dimensions, the ML model 141 may be configured to project the 512 dimensions down to 32 dimensions. The ML model 141 may reduce a size of embedding data input thereto to a lower dimensional size that focuses on speech characteristic information for distinguishing between speech of known users of the device 110. For example, the ML model 141 may reduce the size of embedding data to at least remove data/dimensions corresponding to an acoustic environment of the device 110. Details of how the ML model 141 may be trained to reduce a size of embedding data to focus on speech characteristic information for distinguishing between speech of known users of the device 110 are described below with respect to FIG. 2.

In some embodiments, the ML model 141 may be a neural network. In some embodiments, the ML model 141 may be a single-layer neural network. The ML model 141 may be trained using spoken user input pairs corresponding to various pairings of users having user embedding data stored in the user embedding storage of the device 110. Further details of how the ML model 141 may be trained are described below with respect to FIG. 2.

The ML model 141 takes as input the spoken user input embedding data 137 and generates reduced spoken user input embedding data 143 corresponding to a lower dimensional version of the spoken user input embedding data 137, where the lower number of dimensions are functions of the higher number of dimensions of the spoken user input embedding data 137. The ML model 141 also takes as input the user embedding data 139 and generates reduced user embedding data 145 corresponding to a lower dimensional version of the user embedding data 139, where the lower number of dimensions are functions of the higher number of dimensions of the user embedding data 139. For example, in some embodiments the reduced spoken user input embedding data 143 and the reduced user embedding data 145 may each be vectors of 32 dimensions.

In some embodiments, the reduced spoken user input embedding data 143 may have the same number of dimensions as the spoken user input embedding data 137. In such embodiments, the dimensions of the reduced spoken user input embedding data 143 may be characterized into two portions: a first portion of the dimensions including data corresponding to the data included in the high dimension spoken user input embedding data 137, and a second portion of the dimensions including data that is either randomly selected or redundant/repetitive of the data included in the foregoing first portion of dimensions. In other words, the second portion of dimensions may be used to "pad" the first portion of dimensions so the reduced spoken user input embedding data 143 includes the same number of dimensions as the spoken user input embedding data 137. Such "padding" may be performed by adding data to the output of the ML model 141.

In some embodiments, the reduced user embedding data 145 may have the same number of dimensions as the user embedding data 139. In such embodiments, the dimensions of the reduced user embedding data 145 may be characterized into two portions: a first portion of the dimensions including data corresponding to the data included in the high dimension user embedding data 139, and a second portion of the dimensions including data that is either randomly selected or redundant/repetitive of the data included in the foregoing first portion of dimensions. In other words, the second portion of dimensions may be used to "pad" the first portion of dimensions so the reduced user embedding data 145 includes the same number of dimensions as the user embedding data 139. Such "padding" may be performed by adding data to the output of the ML model 141.

The reduced spoken user input embedding data 143 and the reduced user embedding data 145 may be input to a comparison component 147 of the user group component 135. The comparison component 147 determines score data 149 representing a similarity of the reduced spoken user input embedding data 143 and the reduced user embedding data 145, or a difference between the reduced spoken user input embedding data 143 and the reduced user embedding data 145, depending on how the comparison component 147 is configured. In some embodiments, the score data 149 may be a single numerical value (e.g., on a scale of 0 to 1) representing a combined similarity of, or difference between, the corresponding dimensions in the reduced spoken user input embedding data 143 and the reduced user embedding data 145. In some embodiments, the score data 149 may include a plurality of numerical values (e.g., each on a scale of 0 to 1), where each numerical value represents a similarity of, or difference between, corresponding dimensions in the reduced spoken user input embedding data 143 and the reduced user embedding data 145. In some embodiments, the comparison component 147 may determine the score data 149 to represent a Euclidean distance between the reduced spoken user input embedding data 143 and the reduced user embedding data 145.

The voice-based user recognition component 115 also sends the spoken user input embedding data 137 and the user embedding data 139 to the comparison component 151. Whereas the comparison component 147 is configured to operate of lower dimensional embedding data, the comparison component 151 is configured to operate on higher dimensional embedding data. The comparison component 151 generates score data 153 representing a similarity of the spoken user input embedding data 137 and the user embedding data 139, or a difference between, the spoken user input embedding data 137 and the user embedding data 139, depending on how the comparison component 151 is configured. In some embodiments, the score data 153 may be a single numerical value (e.g., on a scale of 0 to 1) representing a combined similarity of, or difference between, the corresponding dimensions in the spoken user input embedding data 137 and the user embedding data 139. In some embodiments, the score data 153 may include a plurality of numerical values (e.g., each on a scale of 0 to 1), where each numerical value represents a similarity of, or difference between, corresponding dimensions in the spoken user input embedding data 137 and the user embedding data 139. In some embodiments, the comparison component 151 may determine the score data 153 to represent a cosine distance between the spoken user input embedding data 137 and the user embedding data 139.

The decider component 155 takes as input the score data 149 and the score data 153, and determines, based on the score data 149 and the score data 153, score data 157 representing a likelihood that the current spoken user input originated from the user corresponding to the user embedding data 139 (in other words, representing a likelihood that the user 105 corresponds to the user embedding data 139). The decider component 155 may generate the score data 157 in various manners. In some embodiments, the decider component 155 may generate the score data 157 to be an average of the score data 149 and the score data 153. In some embodiments, the decider component 155 may determine the score data 157 to be a linear combination of the score data 149 and the score data 153. In some embodiments, the score data 157 may be computed as a logistic regression of the score data 149 and the score data 153.

The voice-based user recognition component 115 may perform the foregoing processing with respect to the spoken user input embedding data 137 and each instance of user embedding data stored in the user embedding storage of the device 110 at the time of the voice-based user recognition component 115 received the input audio data at step 1. The foregoing may result in the decider component 155 generating a plurality of scores, where each score represents a likelihood of the current spoken user input originating from a different user known to the device 110. For example, the decider component 155 may generate a first score data 157a representing a likelihood that the current spoken user input originated from a first user whose user embedding data is stored in the user embedding storage of the device 110, a second score data 157b representing a likelihood that the current spoken user input originated from a second user whose user embedding data is stored in the user embedding storage of the device 110, etc. until the decider component 155 has generated a score for each user whose user embedding data is stored in the user embedding storage of the device 110.

After the decider component 155 has generated the plurality of scores, the voice-based user recognition component 115 may determine a highest (or best) score of the scores, determine a user profile identifier associated with the user embedding data corresponding to the highest (best) score, determine the user profile identifier to correspond to the user 105 that originated the current spoken user input, and send (step 2) the user profile identifier to the orchestrator component 130. The voice-based user recognition component 115 may not send a user profile identifier to the orchestrator component 130 in every instance. For example, the voice-based user recognition component 115 may determine a highest score of the scores, and determine whether the highest score of the scores satisfies a condition (e.g., a threshold score). If the voice-based user recognition component 115 determines the highest score satisfies (e.g., meets or exceeds) the condition, the voice-based user recognition component 115 determine a user profile identifier associated with the user embedding data corresponding to the highest score, and send (step 2) the user profile identifier to the orchestrator component 130. Conversely, if the voice-based user recognition component 115 determines the highest score fails to satisfy (e.g., falls to meet or exceed) the condition, the voice-based user recognition component 115 may send (step 2), to the orchestrator component 130, data representing the voice-based user recognition component 115 could not recognize the user 105 with a sufficient amount of confidence.

The orchestrator component 130 sends (step 3), to the ASR component 150, the input audio data and the user profile identifier in the situation where the user profile identifier is output by the voice-based user recognition component 115. The ASR component 150 may process the input audio data to determine ASR output data including one or more ASR hypotheses (e.g., token data, natural language text data, corresponding confidence scores, etc.) corresponding to the words included in the spoken user input. In some embodiments, the ASR component 150 may select which acoustic model(s) and/or language model(s) to use to process the input audio data. Details on how the ASR component 150 may process the audio data are described below. The ASR component may send (step 4) the ASR output data to the orchestrator component 130.

The orchestrator component 130 may send (step 5), to the NLU component 160, the ASR output data and the user profile identifier in the situation where the user profile identifier is output by the voice-based user recognition component 115. The NLU component 160 may, in turn, send (step 6), to the skill shortlisting component 165, the ASR output data and the user profile identifier.

The skill shortlisting component 165 is configured to determine a subset of skill components, executed by or in communication with the device 110 and optionally represented as enabled in user profile data corresponding to the user profile identifier, that may perform an action responsive to the spoken user input. Example configuration and processing of the skill shortlisting component 165 are described below. The skill shortlisting component 165 determines a plurality of skill component identifiers corresponding to a plurality of skill components that may perform an action responsive to the spoken user input, and sends (step 7) the plurality of skill component identifiers to the NLU component 160.

After receiving the plurality of skill component identifiers, the NLU component 160 performs NLU processing to determine NLU output data with respect to the plurality of skill components corresponding to the plurality of skill component identifiers. The NLU component 160 may perform intent classification (IC) processing to determine an intent corresponding to the spoken user input. The NLU component 160 may also perform named entity recognition (NER) processing to identify portions of the spoken user input that relate to entities (e.g., persons, places, and things) and corresponding entity types. The NLU component 160 may also perform domain classification (DC) processing to determine a domain corresponding to the user input.

As used herein, a "domain" may refer to a collection of related functionality. A domain may be associated with one or more skill components performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

The NLU component 160 may generate NLU output data including one or more NLU hypotheses, where each NLU hypothesis is associated with a respective skill component (and more particularly a respective skill component identifier) and includes an intent indicator, a domain indicator, and entity data (e.g., one or more entity types associated with respective one or more entity values). Example components and processing of the NLU component 160 are described below. The NLU component 160 sends (step 8) the NLU output data to the orchestrator component 130, which may send (step 9) the NLU output data and the user profile identifier to the skill component selection component 185.

The skill component selection component 185 is configured to determine a single skill component that is to execute to respond to the spoken user input. Example components and processing of the skill component selection component 185 are described below. The skill component selection component 185 may send (step 10), to the orchestrator component 130, a skill component identifier of a skill component 190 that is to process the instant spoken user input.

In response to receiving the skill component identifier from the skill component selection component 185, the orchestrator component 130 may send (step 11), to the skill component 190 corresponding to the skill component identifier received from the skill component selection component 185, the NLU output data (and more particularly the NLU hypothesis generated by the NLU component 160 and associated with the skill component identifier). While FIG. 1A illustrates the skill component 190 being implemented by the device 110, in some embodiments the skill component 190 may be implemented separate from but in communication with the device 110 via an external system (e.g., the system 120 or a separate skill component-specific system).

The skill component 190 may process to determine output data responsive to the spoken user input (e.g., based on the intent and entity data as represented in the NLU output data received by the skill component 190). For example, if the spoken user input requests the playing of a song, the output data may be an audio file (or link to an audio file) corresponding to the song. For further example, if the spoken user input requests weather information, the output data may be structured or natural language data corresponding to the requested weather information.

The skill component 190 sends (step 12) the output data to the orchestrator component 130. The orchestrator component 130 may be configured to determine how the output data is to be presented to the user 105. For example, if the device 110 includes one or more speaker components but not a display, the orchestrator component 130 may determine the output data is to be presented as audio to the user 105. For further example, if the device 110 includes one or more speaker components and a display, the orchestrator component 130 may determine the output data is to be presented as audio and/or video to the user 105. Thus, the orchestrator component 130 may use device type and/or device capabilities, along with one or more data types (e.g., audio data, video data, image data, etc.) included in the output data, in determining how output data is to be presented to the user 105.

In instances where the orchestrator component 130 determines the output data should at least partially be presented as audio, the orchestrator component 130 may send (step 13) the output data to the TTS component 180. The TTS component 180 is configured to generate audio data including synthesized speech corresponding to received data.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The TTS component 180 may send (step 14), to the orchestrator component 130, audio data including synthesized speech, and the orchestrator component 130 may cause the device 110 to present a response to the user input. This may include the device 110 presenting audio and/or video.

Figure 1B:
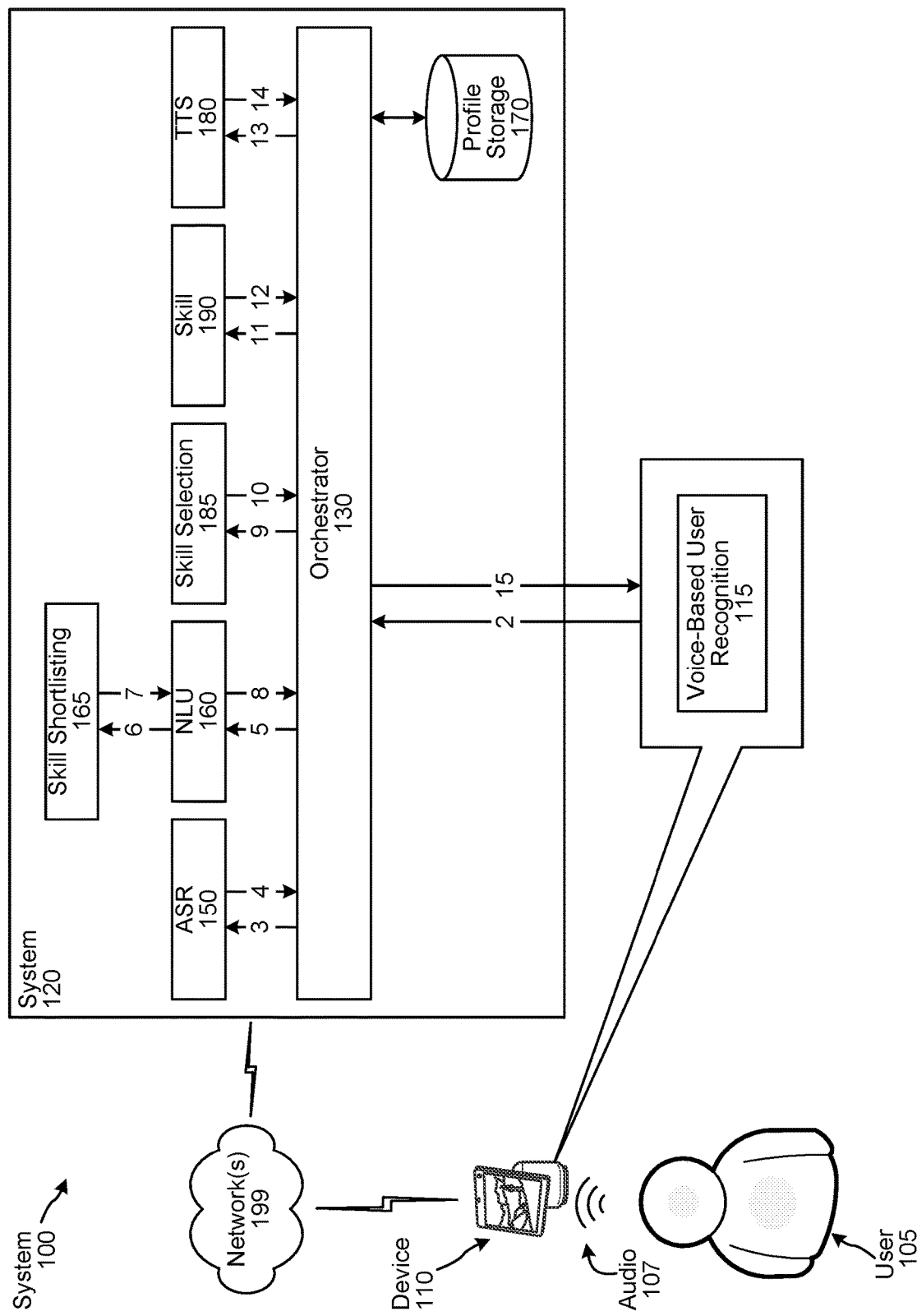
FIG. 1B is a conceptual diagram illustrating a system configured to perform voice-based user recognition processing, where processing is distributed across a device and a system, according to embodiments of the present disclosure.

Referring to FIG. 1B, in some embodiments at least some processing of the current spoken user input may be performed by a system 120. As illustrated in FIG. 1B, the system 100 may include the device 110 in communication with the system 120 across a network(s) 199. The network 199 may include the Internet and/or any other wide- or local-area network, and may include wired, wireless, and/or cellular network hardware.

Each of the components illustrated in FIG. 1B may process in a similar manner as described above with respect to FIG. 1A. A difference between the system architectures in FIGS. 1A and 1B is that in FIG. 1B the device 110 sends (step 2) the user profile identifier, output by the voice-based user recognition component 115, to the orchestrator component 130 as implemented in the system 120. Moreover, after the orchestrator component 130 determines how the output data is to be presented, the orchestrator component 130 of the system 120 may send (step 15), to the device 110 the output data and a command instructing the device 110 to present the output data as audio and/or video.

It will be appreciated that other architectures of the system 100 are possible, and that the present disclosure is not limited to the architectures illustrated in FIGS. 1A and 1B. For example, in some embodiments, all the components, illustrated as being implemented by the device 110 in FIG. 1A, may all be implemented by the system 120. In such embodiments, the device 110 may send the input audio data to the system 120 and receive, from the system 120, the output data and the command instructing how the output data is to be presented. For further example, in some embodiments, the voice-based user recognition component 115, the ASR component 150, the NLU component 160, and the skill shortlisting component 165 may be implemented by the device 110, and the remaining illustrated components of FIGS. 1A and 1B may be implemented by the system 120. The foregoing example are illustrative. Still further system architectures are envisioned.

Figure 2:
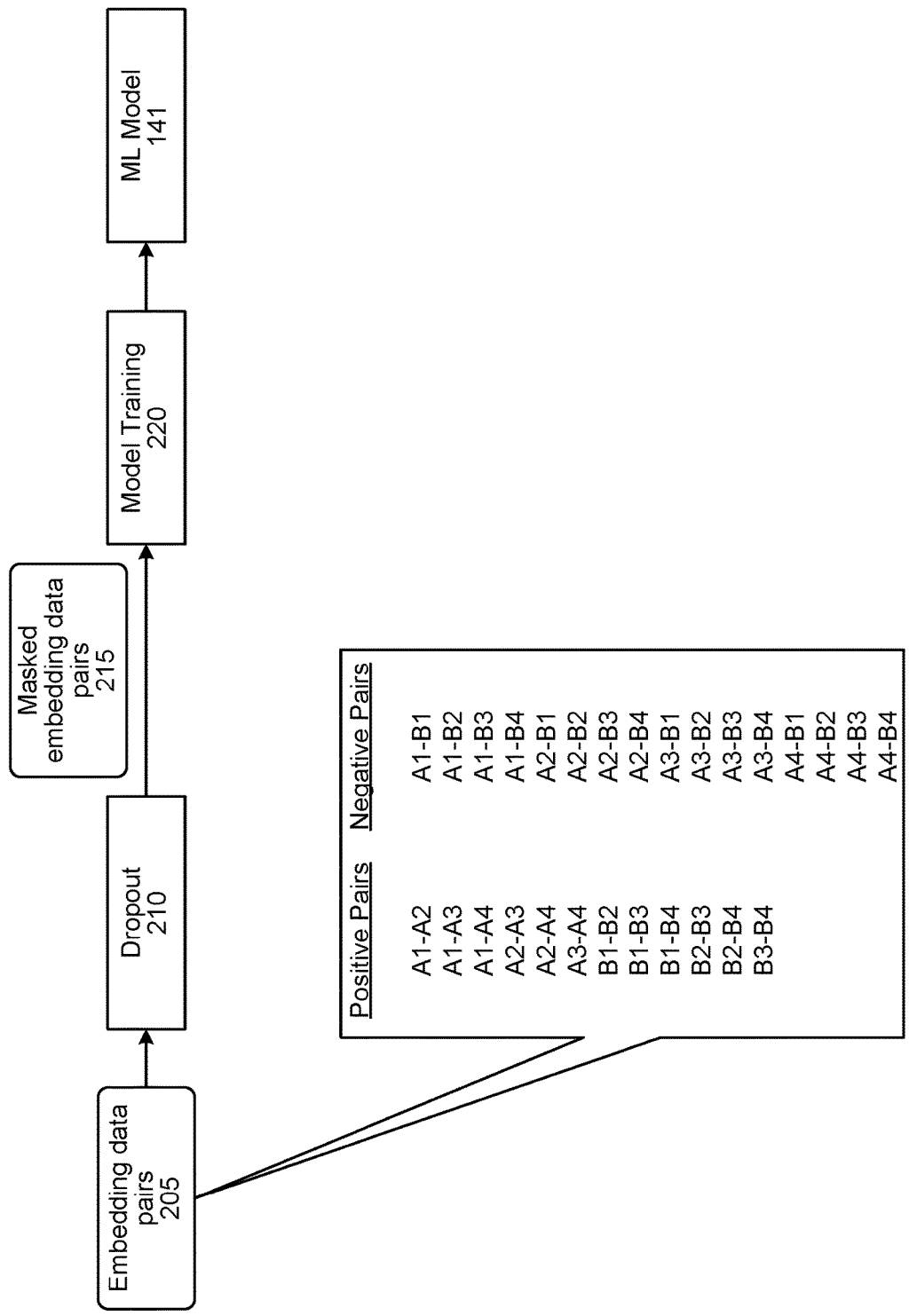
FIG. 2 is a conceptual diagram illustrating how a ML model of a user group component may be trained, according to embodiments of the present disclosure.

FIG. 2 conceptually illustrates how the ML model 141 of the user group component 135 may be configured. A training process for the ML model 141 may start with identifying embedding data pairs 205. The embedding data, of the embedding data pairs 205, may correspond to spoken user inputs of users known to the device 110 (i.e., users whose user profile identifiers are associated with the device 110). Moreover, the embedding data, of the embedding data pairs 205 may correspond to one or more spoken user inputs of one or more users not known to the device, i.e., one or more users who have not provided any spoken user inputs to the device 110 (or another device associated with the same group profile identifier), and/or one or more users who provided one or more spoken user inputs to the device 110 (or another device associated with the same group profile identifier) but whose user profile identifier(s) is not associated with the device 110. In embodiments where the ML model 141 is trained on the device 110, the embedding data, corresponding to one or more spoken user inputs of one or more users not known to the device 110, may be sent to the device 110 by the system 120.

The embedding data pairs 205 may include instances of high dimension embedding data corresponding to spoken user inputs received during the aforementioned described enrollment process. Since, during the enrollment process, the identity of the user (performing the enrollment process) is known, a label associating such an instance of embedding data with the corresponding user (and more particularly the user's user profile identifier) may be referred to as a "real label."

The embedding data pairs 205 may also include instances of high dimension embedding data corresponding spoken user inputs received at runtime (i.e., not received during the aforementioned described enrollment process). Prior to the ML model 141 being trained, the voice-based user recognition component 115 may implement the comparison component 151 but not the user group component 135. In such instances, when the voice-based user recognition component 115 receives input audio data of a (runtime) spoken user input, the voice-based user recognition component 115 may generate spoken user input embedding data 137 corresponding to the runtime spoken user input, and may use the comparison component 151 to process the spoken user input embedding data 137 with respect to various user embedding data stored in the embedding storage of the device 110. As a result, the voice-based user recognition component 115 may determine the spoken user input embedding data 137 corresponds to a particular user embedding data associated with a particular user profile identifier. As a result of this determination, the voice-based user recognition component 115 may generate a label associating the spoken user input embedding data 137 with the user profile identifier. Such a label may be referred to as a "pseudo label" or "machine-generated label" because it is not generated during the enrollment process in which the identity of the user is known, but rather is generated based on the voice-based user recognition component 115 determining the user's identity.

The embedding data pairs 205 may include a plurality of positive embedding data pairs and a plurality of negative embedding data pairs. A positive embedding data pair includes two instances of spoken user input embedding data, where each instance of the spoken user input embedding data in the pair is associated (via a real or pseudo label) with the same user profile identifier. In other words, each instance of spoken user input embedding data, in a positive embedding data pair, corresponds to a respective spoken user input of the same user. A negative embedding data pair includes first and second instances of spoken user input embedding data, where the first instance of spoken user input embedding data is associated (via a real or pseudo label) with a first user profile identifier, and where the second instance of spoken user input embedding data is associated (via a real or pseudo label) with a second user profile identifier. In other words, the first instance of spoken user input embedding data, in a negative embedding data pair, corresponds to a spoken user input of a first user and the second instance of spoken user input embedding data, in the negative embedding data pair, corresponds to a spoken user input of a second user. In some embodiments, where the embedding data pairs 205 include embedding data corresponding to one or more spoken user inputs of one or more users not known to the device 110, such embedding data may only be included in the negative embedding data pairs, and not the positive embedding data pairs.

In some embodiments, the embedding data pairs 205 may only include instances of spoken user input embedding data corresponding to spoken user inputs received by the device 110 (or another device associated with the same group profile identifier). In some embodiments, the embedding data pairs 205 may only include instances of spoken user input embedding data corresponding to spoken user inputs originating from users that performed the herein described voice-based user recognition enrollment process using the device 110 or another device associated with the same group profile identifier. The embedding data pairs 205 may include all possible positive and negative spoken user input embedding data pairs. FIG. 2 illustrates embedding data pairs 205 for the example where a first user (A) and a second user (B) each performed the voice-based user recognition enrollment process, where the first user spoke four prompted spoken user inputs resulting in the corresponding user input embedding data instances A1, A2, A3, and A4, and the second user spoke four prompted spoken user inputs resulting in the corresponding user input embedding data instances B1, B2, B3, and B4.

It will be appreciated that the example positive and negative spoken user input embedding data pairs illustrated in FIG. 2 are merely illustrative, and that more of such pairs may be included in instances where more than two users perform the voice-based user recognition enrollment process. Moreover, it will be appreciated that, while the example positive and negative spoken user input embedding data pairs illustrated in FIG. 2 represent an example instance where the embedding data pairs 205 only correspond to prompted spoken user inputs received during the voice-based user recognition enrollment process, that the present disclosure also envisions situations where non-prompted, runtime spoken user input embedding data may be represented in the embedding data pairs 205. Furthering the above example, the embedding data pairs 205 may be generated using 50 instances of spoken user input embedding data corresponding to 50 spoken user inputs of the first user (A) (e.g., where 4 of the 50 instances correspond to the prompted spoken user inputs received during the voice-based user recognition enrollment process, and the remaining 46 instances correspond to runtime spoken user inputs the voice-based user recognition component 115 determined originated from the first user).

In some embodiments, the embedding data pairs 205 may be generated using spoken user inputs embeddings corresponding to spoken user inputs received by the device 110 (or another device associated with the same group profile identifier) but which are not associated with any particular user profile identifier (e.g., spoken user inputs spoken by users not known to the device 110). For example, one or more users (who have not performed the voice-based user recognition process) may speak various spoken user inputs to the device 110 or another device associated with the same group profile identifier. Clustering may be performed on various spoken user input embedding data (corresponding to the various spoken user inputs) to identify one or more distinct clusters, where a cluster corresponds to instances of spoken user input embedding data having the same or substantially similar speech characteristics (i.e., corresponding to spoken user inputs originating from the same user). The embedding data pairs 205 may be generated to include positive and/or negative pairs including the instances of spoken user input embedding data of a determined cluster. In some embodiments, a cluster of spoken user input embedding data may only be represented in the embedding data pairs 205 if the cluster includes at least a threshold number (e.g., 50) of instances of spoken user input embedding data.

In instances where the embedding data pairs 205 are generated by the system 120, the embedding data pairs 205 may be generated to include spoken user input embedding data corresponding to one or more spoken user inputs or one or more users that have not spoken user inputs to the device 110 (or another device associated with the same group profile identifier). For example, the system 120 may generate the embedding data pairs 205 using spoken user input embedding data corresponding to a spoken user input received at a device corresponding to a same geographic location (e.g., country, state, etc.) as the device 110. For further example, the system 120 may generate the embedding data pairs 205 using spoken user input embedding data corresponding to a spoken user input corresponding to a same language (e.g., English, Spanish, French, etc.) as spoken user inputs received by the device 110. In instances where the ML model 141 is trained on the device 110, the system 120 may send the foregoing spoken user input embedding data to the device 110 for inclusion in the embedding data pairs 205 as determined by the device 110.

In some embodiments, when a guest user newly associates its user profile identifier with the device 110 (as described herein above), the embedding data pairs 205 may be updated to include the spoken user input embedding data used to generate the guest user's user embedding data. For example, in embodiments where the system 120 implements a dropout component 210 and the model training component 220, the system 120 may determine the instances of spoken user input embedding data used to generate the guest user's user embedding data, update the embedding data pairs 205 to include the determined spoken user input embedding data, and update the ML model 141 using the updated embedding data pairs. In embodiments where the device 110 implements the dropout component 210 and the model training component 220, the system 120 may determine the instances of spoken user input embedding data used to generate the guest user's user embedding data and send same to the device 110, and the device 110 may locally update the embedding data pairs 205 to include the received spoken user input embedding data, and update the ML model 141 using the updated embedding data pairs.

The embedding data pairs 205 may be input to the dropout component 210, in some embodiments. In some instances, processing of the embedding data pairs 205 by the dropout component 210 prior to model training may improve an accuracy of the ML model 141 as compared to if the embedding data pairs 205 were not processed by the dropout component 210 prior to model training. For example, when the dropout component 210 processes the embedding data pairs 205 prior to model training, the results ML model 141 may be better configured to process when certain features of spoken user input embedding data, corresponding to a current runtime spoken user input, are corrupted due to background noise, etc. In other embodiments, the embedding data pairs 205 may be input to a model training component 220 without first being processing by the dropout component 210.

The dropout component 210 may be configured to randomly mask (e.g., zero-out or null) a certain amount of dimensions in the spoken user input embedding data (e.g., vectors) represented in the embedding data pairs 205. For example, when the embedding data pairs 205 include spoken user input embedding data represented as vectors, the dropout component 210 may randomly zero-out/null a certain amount of dimensions in each vector. Such random masking of dimensions may configure the resulting ML model 141 to be able to account for fixed-size embedding data including different dimensions at runtime.

In some embodiments, during training of the ML model 141, more than one training epoch may be performed. The dropout component 210 may be configured to randomly mask (or drop out) different dimensions of the same training samples/data in different epochs to introduce randomness into the training samples/data, and increase robustness of the ML model 141. The dropout component 210 may be configured to cause the instances of spoken user input embedding data, of a single embedding data pair, to experience masking at the same positions. The dropout component 210 may apply masking to both positive and negative pairs in a single epoch. In some embodiments, the dropout component 210 may apply masking to all instances of spoken user input embedding data, in the embedding data pairs 205, in a single epoch.

The dropout component 210 may be configured to mask different amounts of dimensions. In some embodiments, a 0.5 dropout (e.g., a masking of 50% of the dimensions of an instance of spoken user input embedding data) may be beneficial. In some embodiments, the amount of dimensions masked between training epochs may remain constant. Due to the dropout component 210 being configured to randomly mask embedding data dimensions, the amount of dimensions masked between training epochs may remain constant, but the dimensions that masking is applied to may change between epochs. In other embodiments, the amount of dimensions masked (e.g., the dropout rate) may vary between training epochs.

The dropout component 210 outputs masked embedding data pairs 215 corresponding to the embedding data pairs 205 including masked dimensions. The masked embedding data pairs 215 may be input to a model training component 220.

The model training component 220 may be configured to generate the ML model 141 using the masked embedding data pairs 215, or the embedding data pairs 205 in instances where the embedding data pairs 205 are not input to the dropout component 210. The model training component 220 is not limited to any particular training technique or configuration, as different training techniques and configurations are beneficial in different circumstances. The model training component 220 may configure the ML model 141 according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply ML techniques, ML processes themselves need to be trained. Generating the ML model 141 may require establishing a "ground truth" for training examples. In ML, the term "ground truth" refers to the accuracy of a training set's classification for supervised learning techniques. The model training component 220 may train the ML model 141 using various techniques including back-propagation, statistical learning, supervised learning, semi-supervised learning, stochastic learning, or other known techniques.

In some embodiments, the model training component 220 may configure the ML model 141 as a neural network configured to project high dimension spoken user input embedding data and high dimension user embedding data to a low dimension space, as described herein above with respect to FIG. 1A. Since, as described above, the embedding data pairs 205 may include instances of positive and negative pairs of spoken user input embedding data representing spoken user inputs received by the device 110 (and/or another device associated with the same group profile identifier), the neural network may be configured to learn which features of embedding data (e.g., vectors) are important for distinguishing users of the device 110. For example, when the embedding data pairs 205 represent spoken user inputs of users of a household, the neural network may be configured to learn which features are important to distinguish users of the household. For further example, when the embedding data pairs 205 represent spoken user inputs of employees of a business, the neural network may be configured to learn which features are important to distinguish employees of the business. In some embodiments, the model training component 220 may train the ML model 141 to be a single layer neural network.

In some instances, the embedding data pairs 205 may include more negative pairs than positive pairs. In such situations, the model training component 220 may apply a weight to be positive pairs during training to compensate for loss attributed to there being less positive pairs than negative pairs. In some embodiments, the weight may be equal to the number of negative pairs divided by the number of positive pairs in the embedding data pairs 205.

The following is a non-limiting example of how the voice-based user recognition component 115 of FIG. 1A may be configured. For a group of users, the training component 220 may train the ML model 141 to identify and discriminate among the users in the group, as well as guest users. The inputs to the ML model 141 may be two spoken user input-level global embeddings $E_1, E_2 \in R^D$, extracted from corresponding audio features $X_1, X_2 \in R^{T \times F}$ by a front-end spoken user input embedding extractor, where T is the number of frames and F is the number of frequency bins. Global embeddings $(E_1, E_2)$ may be length-normalized. The scoring model may be designed to linearly fuse a global cosine score $S_g$ based on the global embedding space $(E_1, E_2)$ with a Euclidean distance score $S_h$ based on a lower-dimensional space, where global embeddings are mapped into the user group space by the ML model 141 trained with household-specific pairs of data $\tilde{E}_1, \tilde{E}_2 \in R^K$ with K<D. Prior to the ML model 141, the dropout component 210 may optionally be used to generate masked inputs $E^*_1, E^*_2$. An affine transform may then be applied into a lower dimension, followed by a ReLU non-linearity. Note that the parameters of the ML model 141 (InputDropout, W, B) are shared for pairs of input embeddings $E_1, E_2$.

The user group-adapted Euclidean distance score $S_h$ aims to complement the global cosine score $S_g$ by focusing on the distribution of embeddings found in each user group. The final score may be computed as a logistic regression with inputs $S_g$ and $S_h$, and may lie between 0 and 1. The model parameters may be trained in an end-to-end fashion via binary cross-entropy loss. In summary, the voice-based user recognition component 115 may perform the following computation:

$E_i$=EmbeddingExtractor($X_i$), i=1, 2
$S_g$=CosineSimilarity($E_1, E_2$)
$E^*_i$=InputDropout($E_i$), i=1, 2
$\tilde{E}_i$=ReLU(W$E^*_i$+B), i=1, 2
$S_h$=EuclideanDistance($\tilde{E}_1, \tilde{E}_2$)
S=Sigmoid($w_1 S_g + w_2 S_h + b$)

where W, B are learnable weights and biases of the ML model 141 (e.g., neural network), $w_1, w_2$, b are learnable weights and bias for the score fusion, and S is the fused score based on which users are identified or rejected.

For each user group with N users, positive and negative training pairs may be constructed for contrastive learning (as described herein above). Positive pairs ($S_{pos}$) are formed from spoken user inputs from the same user in the group; negative pairs ($S_{neg}$) are formed by spoken user inputs between users of the group and between a user of the group and a guest user not included in the user group. To compensate for a greater number of negative examples, a fixed weight hyper-parameter $w=|S_{neg}|/|S_{pos}|$ may be used in the loss function:

$$L = -\frac{1}{|S_{pos}| + |S_{neg}|}\left(w\sum_{i \in S_{pos}} \log(S_i) + w\sum_{i \in S_{neg}} \log(1 - S_i)\right), \quad \text{Equation 1}$$

where $S_i$ is the fused score of a given pair ($S_i$=Score($E_{i,1}, E_{i,2}$)).

During inference, the voice-based user recognition component 115 may precompute the average embeddings of each user of the group ($E_{enroll}$). For a user group with N users we the scoring of the current spoken user input may be run against each user of the group ($S^k$= Score($E_{enroll}^k, E_{current}^k$), k=1, . . . , N), and the user with the maximum score $S_{max}$=max ($S^1, \ldots, S^N$) may be identified as the user that originated the current spoken user input. If $S_{max}$ is greater than a predefined threshold, the hypothesis that the current spoken user input originated by the user producing the best score (e.g., the rank-1 user) may be accepted. Otherwise, it may be predicted that the user is not part of the user group (i.e., a guest).

Referring now to FIGS. 3A-3C, various example configurations of the voice-based user recognition component are described. As illustrated in FIGS. 3A-3C, the voice-based user recognition component 115 may include a router component 310. As illustrated in FIGS. 3A-3C, the user group component 135 and the comparison component 151 may not both process in every instance. The router component 310 is configured to route the spoken user input embedding data 137 and the user embedding data 139 to the user group component 135 and/or the comparison component 151 as described below.

In some instances, training of the ML model 141, of the user group component 135, may be beneficial if the embedding data pairs 205 include at least a threshold number of spoken user input embedding data instances for each user (e.g., at least 50 instances of spoken user input embedding data instances for each user). In some instances, the device may be associated with two or more user profile identifiers (i.e., two or more users may be known to the device 110 and the voice-based user recognition component 115 may have access to respective user embedding data for each of the known users), but the system 120/device 110 may store less than the threshold number of spoken user input embedding data instances for each user. As described herein above with respect to FIG. 2, the ML model 141 may be trained using spoken user input embedding data corresponding to a least two users. However, in some instances, the device may be associated with one user profile identifier (i.e., one users may be known to the device 110 and the voice-based user recognition component 115 may have access to user embedding data for the known user). In the foregoing situations, it may be determined that there is not a sufficient amount of spoken user input embedding data instances to generate the ML model 141 to perform at a desired level. In these instances and as illustrated in FIG. 3A, the voice-based user recognition component 115 may be configured to include the router component 310, the comparison component 151, and the user group component 135, but the user group component 135 may not be operational since it does not have the ML model 141. When the voice-based user recognition component 115 is configured as illustrated in FIG. 3A, the router component 310 may send each pairing of the spoken user input embedding data 137 (representing the current spoken user input) and user embedding data 139 to the comparison component 151. The comparison component 151 may generate a respective score data 153 representing a similarity between the (current) spoken user input embedding data 137 and each user embedding data, and the voice-based user recognition component 115 may determine the identity of the user to be that of the top scoring user embedding data (assuming the top score satisfies a condition (e.g., a threshold score)).

In instances where the device is associated with two or more user profile identifiers (i.e., two or more users may be known to the device 110 and the voice-based user recognition component 115 may have access to respective user embedding data for each of the known users), and the system 120/device 110 store at least the threshold number of spoken user input embedding data instances for each user, the processing of FIG. 2 may be performed to generate the ML model 141. In these instances and as illustrated in FIG. 3B, the voice-based user recognition component 115 may be configured to include the router component 310, user group component 135 including the ML model 141, and the comparison component 151. When the voice-based user recognition component 115 is configured as illustrated in FIG. 3B, the router component 310 may send each pairing of the spoken user input embedding data 137 (representing the current spoken user input) and user embedding data 139 to the user group component 135, and not the comparison component 151 (since the ML model 141 is trained with respect to each user known to the device 110). The user group component 135 may generate a respective score data 149 representing a similarity between the (current) spoken user input embedding data 137 and each user embedding data, and the voice-based user recognition component 115 may determine the identity of the user to be that of the top scoring user embedding data (assuming the top score satisfies a condition (e.g., a threshold score)).

It will be appreciated that, in some embodiments, the processing by the user group component 135, and not the comparison component 151, in FIG. 3B may result in reduced latency of voice-based user recognition processing.

In instances where the device is associated with three or more user profile identifiers (i.e., three or more users may be known to the device 110 and the voice-based user recognition component 115 may have access to respective user embedding data for each of the known users), and the system 120/device 110 store at least the threshold number of spoken user input embedding data instances for at least two of the users, the configuration of the voice-based user recognition component 115 illustrated in FIG. 3C may be implemented. With respect to FIG. 3C, the processing of FIG. 2 may be performed to generate the ML model 141 using embedding data pairs 205 representing the spoken user input embedding data instances of the at least two users having at least the threshold number of spoken user input embedding data instances stored. When the router component 310 receives user embedding data 139 corresponding to a user whose spoken user input embedding data was used to train the ML model 141, the router component 310 may send the user embedding data 139 and the spoken user input embedding data 137 (corresponding to the current user input) to the user group component 135 to generate score data 149. In some embodiments, the router component 310 may also send the user embedding data 139 and the spoke user input embedding data 137 to the comparison component 151 to generate the score data 153, and the score data 149 and the score data 153 may be input to the decider component 155 to generate the score data 157. When the router component 310 receives user embedding data 139 corresponding to a user whose spoken user input embedding data was not used to train the ML model 141, the router component 310 may send the user embedding data 139 and the spoken user input embedding data 137 (corresponding to the current user input) to the comparison component 151 to generate score data 153 (and not the user group component 135 since the user whose spoken user input embedding data was not used to train the ML model 141). The voice-based user recognition component 115 may determine the identity of the user to be that of the top scoring user embedding data (assuming the top score satisfies a condition (e.g., a threshold score)).

It will be appreciated that, in some embodiments, the processing by the user group component 135 and the comparison component 151 in FIG. 3C may result in increased accuracy of voice-based user recognition processing.

In some instances, when a user first becomes known to the device 110 (e.g., via performing the herein-described voice-based user recognition enrollment process, or by a guest user requesting its user profile identifier being associated with the device 110), there may not be enough (e.g., 50) spoken user input embedding data instances (corresponding to spoken user inputs of the user) to train the ML model 141 with respect to the user. In such instances, the voice-based user recognition component 115 may perform voice-based user recognition processing with respect to that user (i.e., using that user's user embedding data 139) using the comparison component 151 until the voice-based user recognition component 115 is able to determine a number of runtime spoken user input embedding data instances as being spoken by the user, where the number corresponds to enough spoken user input embedding data instances to train the ML model 141. Once this occurs, the ML model 141 may be trained using the aforementioned runtime spoken user input embedding data instances (and optionally spoken user input embedding data instances corresponding to spoken user inputs prompted during the aforementioned enrollment process) such that, going forward, the voice-based user recognition component 115 may use the user group component 135 (and optionally the comparison component 151) to determine when the foregoing user spoke a user input.

Figure 4:
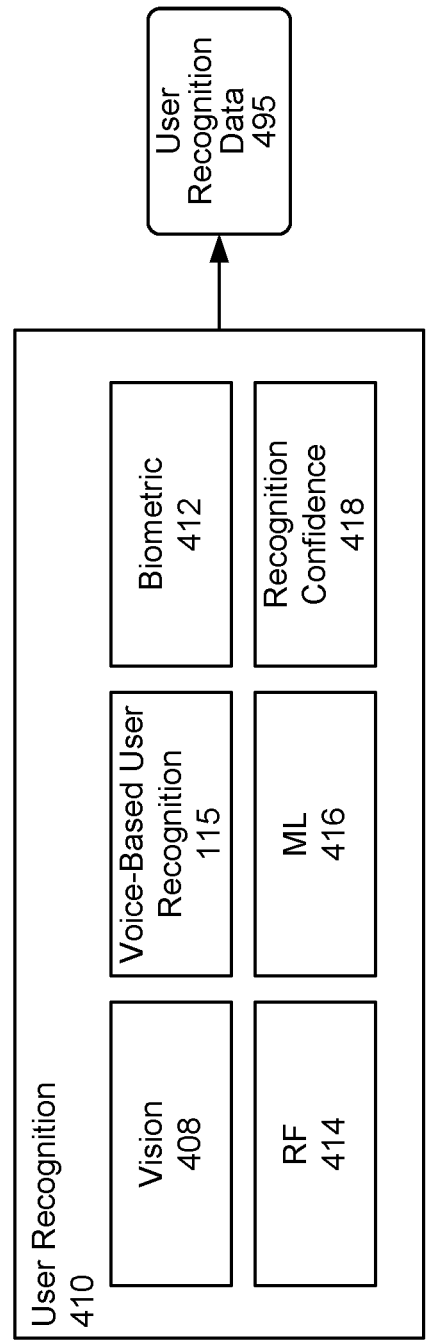
FIG. 4 is a schematic diagram of an illustrative architecture of a user recognition component, according to embodiments of the present disclosure.

The device 110 and/or the system 120 may include a user recognition component 410 that recognizes one or more users using a variety of data. As illustrated in FIG. 4, the user recognition component 410 may include one or more subcomponents including a vision component 408, the voice-based user recognition component 115, a biometric component 412, a radio frequency (RF) component 414, a machine learning (ML) component 416, and a recognition confidence component 418. In some instances, the user recognition component 410 may monitor data and determinations from one or more subcomponents to determine an identity of one or more users associated with data input to the device 110 and/or the system 120. The user recognition component 410 may output user recognition data 495, which may include a user profile identifier associated with a user the user recognition component 410 determines originated data input to the device 110 and/or the system 120. The user recognition data 495 may be used to inform processes performed by various components of the device 110 and/or the system 120.

The vision component 408 may receive data from one or more sensors capable of providing images (e.g., cameras) or sensors indicating motion (e.g., motion sensors). The vision component 408 can perform facial recognition or image analysis to determine an identity of a user and to associate that identity with a user profile identifier associated with the user. In some instances, when a user is facing a camera, the vision component 408 may perform facial recognition processing and identify the user with a high degree of confidence. In other instances, the vision component 408 may have a low degree of confidence of an identity of a user, and the user recognition component 410 may utilize determinations from additional components to determine an identity of the user. The vision component 408 can be used in conjunction with other components to determine an identity of the user. For example, the user recognition component 410 may use data from the vision component 408 with data from the voice-based user recognition component 115 to identify what user's face appears to be speaking at the same time audio is captured by the device 110 the user is facing for purposes of identifying the user who spoke the input to the device 110 and/or the system 120.

The system 100 of the present disclosure may include biometric sensors that transmit data to the biometric component 412. For example, the biometric component 412 may receive data corresponding to fingerprints, iris or retina scans, thermal scans, weights of users, a size of a user, pressure (e.g., within floor sensors), etc., and may determine a biometric profile corresponding to a user. The biometric component 412 may distinguish between a user and sound from a television, for example. Thus, the biometric component 412 may incorporate biometric information into a confidence level for determining an identity of a user. Biometric information output by the biometric component 412 can be associated with specific user profile data such that the biometric information uniquely identifies a user profile of a user.

The radio frequency (RF) component 414 may use RF localization to track devices that a user may carry or wear. For example, a user (and a user profile identifier associated with the user) may be associated with a device. The device may emit RF signals (e.g., Wi-Fi, Bluetooth®, etc.). A device may detect the signal and indicate to the RF component 414 the strength of the signal (e.g., as a received signal strength indication (RSSI)). The RF component 414 may use the RSSI to determine an identity of a user (with an associated confidence level). In some instances, the RF component 414 may determine that a received RF signal is associated with a mobile device that is associated with a particular user profile identifier.

In some instances, a personal device (such as a phone, tablet, wearable, or other device) may include some RF or other detection processing capabilities so that a user who speaks a user input may scan, tap, or otherwise acknowledge the user's personal device to the device 110. In this manner, the user may "register" with the device 110/system 120 for purposes of the user recognition component 410 determining who spoke a particular user input. Such a registration may occur prior to, during, or after speaking of a user input.

The ML component 416 may track the behavior of various users as a factor in determining a confidence level of the identity of the user. By way of example, a user may adhere to a regular schedule such that the user is at a first location during the day (e.g., at work or at school). In this example, the ML component 416 would factor in past behavior and/or trends in determining the identity of the user that provided user input to the device 110 and/or the system 120. Thus, the ML component 416 may use historical data and/or usage patterns over time to increase or decrease a confidence level of an identity of a user.

In at least some instances, the recognition confidence component 418 receives determinations from the various components 408, 115, 412, 414, and 416, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 495.

The user recognition data 495 may include the top-scoring user profile identifier as determined by the user recognition component 410. The user recognition component 410 may send the user recognition data 495 to the orchestrator component 130, which may facilitate processing as described herein with respect to FIGS. 1A and 1B.

The following is a general description of possible components of the system 120 and device 110. The various components of the system 120 may be located on a same or different physical devices. Communication between various components may occur directly or across a network(s) 199.

A microphone or array of microphones (of or otherwise associated with the device 110) may capture the audio 107. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data representing the audio 107, the device 110 may determine if the speech is directed at the device 110/system 120. In some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword.

Thus, the wakeword detection component may compare the audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component XXJ20 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component detects a wakeword, the device 110 may "wake" and further processing the spoken user input using the components described herein.

The ASR component 150 transcribes the audio data into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data. Each ASR hypothesis may be associated with a score representing a confidence of ASR processing performed to determine the ASR hypothesis with which the score is associated.

The ASR component 150 interprets the speech in the audio data based on a similarity between the audio data and pre-established language models. For example, the ASR component 150 may compare the audio data with models for sounds (e.g., subword units, such as phonemes, etc.) and sequences of sounds to identify words that match the sequence of sounds of the speech represented in the audio data.

The skill shortlisting component 165 selects skill components that may relate to ASR output data (e.g., skill components that may execute with respect to the spoken user input). Without the skill shortlisting component 165, the NLU component 160 may process ASR output data input thereto with respect to every skill component of or in communication with the device 110/system 120, either in parallel, in series, or using some combination thereof. By implementing the skill shortlisting component 165, the NLU component 160 may process ASR output data with respect to only the skill components that may execute with respect to the user input. This reduces total compute power and latency attributed to NLU processing.

The skill shortlisting component 165 may include one or more trained models. The model(s) may be trained to recognize various forms of user inputs that may be received by the device 110/system 120. For example, during a training period, a skill component developer may provide training text data representing sample user inputs that may be provided by a user to invoke the skill component. For example, for a ride sharing skill component, a skill component developer associated with the ride sharing skill component may provide training text data including text corresponding to "get me a cab to [location]," "get me a ride to [location]," "book me a cab to [location]," "book me a ride to [location]," etc.

The one or more trained models that will be used by the skill shortlisting component 165 may be trained, using the training text data representing sample user inputs, to determine other potentially related user input structures that users may try to use to invoke the particular skill component. During training, the skill component developer may be queried regarding whether the determined other user input structures are permissible, from the perspective of the skill component developer, to be used to invoke the skill component. The alternate user input structures may be derived by one or more trained models during model training and/or may be based on user input structures provided by different skill component developers.

The skill component developer may also provide training text data indicating grammar and annotations.

Each trained model of the skill shortlisting component 165 may be trained with respect to a different skill component. Alternatively, the skill shortlisting component 165 may use one trained model per domain, such as one trained model for skill components associated with a weather domain, one trained model for skill components associated with a ride sharing domain, etc.

The sample user inputs provided by a skill component developer, and related sample user inputs potentially determined during training, may be used as binary examples to train a model associated with a skill component associated with the skill component developer. The model associated with the particular skill component may then be operated at runtime by the skill shortlisting component 165. For example, some sample user inputs may be positive examples (e.g., user inputs that may be used to invoke the skill component). Other sample user inputs may be negative examples (e.g., user inputs that may not be used to invoke the skill component).

As described above, the skill shortlisting component 165 may include a different trained model for each skill component, a different trained model for each domain, or some other combination of trained model(s). In some embodiments, the skill shortlisting component 165 may alternatively include a single model. The single model may include a portion trained with respect to characteristics (e.g., semantic characteristics) shared by all skill components of the system 100. The single model may also include skill component-specific portions, with each skill component-specific portion being trained with respect to a specific skill component.

Implementing a single model with skill component-specific portions may result in less latency than implementing a different trained model for each skill component because the single model with skill component-specific portions limits the number of characteristics processed on a per skill component level.

The portion trained with respect to characteristics shared by more than one skill component may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

Clustering may not be beneficial in every instance because it may cause the skill shortlisting component 165 to output indications of only a portion of the skill components that the ASR output data may relate to. For example, a user input may correspond to "tell me about Tom Collins." If the model is clustered based on domain, the skill shortlisting component 165 may determine the user input corresponds to a drink recipe skill component even though the user input may also correspond to an information skill component (e.g., including information about a person named Tom Collins).

The skill shortlisting component 165 may receive ASR output data. The ASR output data may be embed into a form processable by a trained model(s) using sentence embedding techniques as known in the art. Sentence embedding results in the ASR output data including text in a structure that enables the trained models of the skill shortlisting component 165 to operate on the ASR output data. For example, an embedding of the ASR output data may be a vector representation of the ASR output data.

The skill shortlisting component 165 may make binary determinations (e.g., yes or no) regarding which skill components relate to the ASR output data. The skill shortlisting component 165 may make such determinations using the one or more trained models described herein above. If the skill shortlisting component 165 implements a single trained model for each skill component, the skill shortlisting component 165 may run the models that are associated with enabled skill components as indicated in a user profile associated with the device 110 and/or user that originated the user input.

The skill shortlisting component 165 may generate an n-best list of skill components that may execute with respect to the user input represented in the ASR output data. The size of the n-best list of skill components is configurable. In an example, the n-best list of skill components may indicate every skill component of the system 100 as well as contain an indication, for each skill component, representing whether the skill component is likely to execute the user input represented in the ASR output data. In another example, instead of indicating every skill component of the system 100, the n-best list of skill components may only indicate the skill components that are likely to execute the user input represented in the ASR output data. In yet another example, the skill shortlisting component 165 may implement thresholding such that the n-best list of skill components may indicate no more than a maximum number of skill components that may execute the user input represented in the ASR output data. In an example, the threshold number of skill components that may be represented in the n-best list of skill components is ten. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 165 may output a different n-best list of skill components for each ASR hypothesis. Alternatively, the skill shortlisting component 165 may output a single n-best list of skill components representing the skill components that are related to the multiple ASR hypotheses represented in the ASR output data.

As indicated above, the skill shortlisting component 165 may implement thresholding such that an n-best list of skill components output therefrom may include no more than a threshold number of entries. If the ASR output data includes more than one ASR hypothesis, the n-best list of skill components output by the skill shortlisting component 165 may include no more than a threshold number of entries irrespective of the number of ASR hypotheses output by the ASR component XXA50. Alternatively or in addition, the n-best list of skill components output by the skill shortlisting component 165 may include no more than a threshold number of entries for each ASR hypothesis (e.g., no more than five entries for a first ASR hypothesis, no more than five entries for a second ASR hypothesis, etc.).

In addition to making a binary determination regarding whether a skill component potentially relates to the ASR output data, the skill shortlisting component 165 may generate confidence scores representing likelihoods that skill components relate to the ASR output data. If the skill shortlisting component 165 implements a different trained model for each skill component, the skill shortlisting component 165 may generate a different confidence score for each individual skill component trained model that is run. If the skill shortlisting component 165 runs the models of every skill component when ASR output data is received, the skill shortlisting component 165 may generate a different confidence score for each skill component. If the skill shortlisting component 165 runs the models of only the skill components that are associated with skill components indicated as enabled in a user profile associated with the device 110 and/or user that originated the user input, the skill shortlisting component 165 may only generate a different confidence score for each enabled skill component. If the skill shortlisting component 165 implements a single trained model with skill component-specific trained portions, the skill shortlisting component 165 may generate a different confidence score for each skill component who's specifically trained portion is run. The skill shortlisting component 165 may perform matrix vector modification to obtain confidence scores for all skill components in a single instance of processing of the ASR output data.

An n-best list of skill components including confidence scores that may be output by the skill shortlisting component 165 may be represented as, for example:

Search skill component, 0.67
Recipe skill component, 0.62
Information skill component, 0.57
Shopping skill component, 0.42

As indicated, the confidence scores output by the skill shortlisting component 165 may be numeric values. The confidence scores output by the skill shortlisting component 165 may alternatively be binned values (e.g., high, medium, low).

The n-best list of skill components may only include entries for skill components having a confidence score satisfying (e.g., equaling or exceeding) a minimum threshold confidence score. Alternatively, the skill shortlisting component 165 may include entries for all skill components associated with enabled skill components of the current user, even if one or more of the skill components are associated with confidence scores that do not satisfy the minimum threshold confidence score.

The skill shortlisting component 165 may consider other data when determining which skill components may relate to the user input represented in the ASR output data as well as respective confidence scores. The other data may be character embedded prior to being input to the skill shortlisting component 165. The other data may alternatively be embedded using other techniques known in the art prior to being input to the skill shortlisting component 165.

The other data may include usage history data associated with the device 110 and/or user that originated the user input. For example, a confidence score of a skill component may be increased if user inputs received by the device 110 and/or originating from the user routinely invoke the skill component. Conversely, a confidence score of a skill component may be decreased if user inputs received by the device 110 and/or originating from the user rarely invoke the skill component. Thus, the other data may include a user profile identifier of the user associated with the ASR output data.

The other data may also include data indicating the skill components that are enabled with respect to the device 110 and/or user that originated the user input. The skill shortlisting component 165 may use such data to determine which skill component-specific trained models to run. That is, the skill shortlisting component 165 may determine to only run the trained models associated with skill components that are enabled for the current user.

The skill shortlisting component 165 may alternatively use such data to alter confidence scores of skill components. As an example, considering two skill components, a first skill component enabled for the current user and a second skill component not enabled for the user, the skill shortlisting component 165 may run a first model specific to the first skill component as well as a second model specific to the second skill component. Alternatively, the skill shortlisting component 165 may run a model configured to determine a score for each of the first and second skill components. The skill shortlisting component 165 may determine a same confidence score for each of the first and second skill components in the first instance. The skill shortlisting component 165 may then alter those confidence scores based on which skill component is enabled for the current user. For example, the skill shortlisting component 165 may increase the confidence score associated with the first (enabled) skill component while leaving the confidence score associated with the second (unenabled) skill component the same. Alternatively, the skill shortlisting component 165 may leave the confidence score associated with the first (enabled) skill component the same while decreasing the confidence score associated with the second (unenabled) skill component. Moreover, the skill shortlisting component 165 may increase the confidence score associated with the first (enabled) skill component as well as decrease the confidence score associated with the second (unenabled) skill component.

As indicated, a user profile may indicate which skill components a corresponding user has enabled (e.g., authorized to execute using data represented in the user profile). Such indications may be stored in the profile storage 170. When the skill shortlisting component 165 receives the ASR output data, the skill shortlisting component 165 may determine whether profile data associated with the user that originated and/or device 110 that received the user input includes an indication of enabled skill components.

The other data may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The skill shortlisting component 165 may use such data to determine which skill component-specific trained models to run. For example, if the device 110 corresponds to a displayless type device, the skill shortlisting component 165 may determine not to run trained models specific to skill components that output video data.

The skill shortlisting component 165 may alternatively use such data to alter confidence scores of skill components. As an example, considering two skill components, one that outputs audio data and another that outputs video data, the skill shortlisting component 165 may run a first model specific to the skill component that generates audio data as well as a second model specific to the skill component that generates video data. Alternatively, the skill shortlisting component 165 may run a model configured to determine a score for each skill component. The skill shortlisting component 165 may determine a same confidence score for each of the skill components in the first instance. The skill shortlisting component 165 may then alter the original confidence scores based on the type of the device 110 that received the user input corresponding to the ASR output data. For example, if the device 110 is a displayless device, the skill shortlisting component 165 may increase the confidence score associated with the skill component that generates audio data while leaving the confidence score associated with the skill component that generates video data the same. Alternatively, if the device 110 is a displayless device, the skill shortlisting component 165 may leave the confidence score associated with the skill component that generates audio data the same while decreasing the confidence score associated with the skill component that generates video data. Moreover, if the device 110 is a displayless device, the skill shortlisting component 165 may increase the confidence score associated with the skill component that generates audio data as well as decrease the confidence score associated with the skill component that generates video data.

The type of device information represented in the other data may represent output capabilities of the device to be used to output content to the user, which may not necessarily be the user input-receiving device. For example, a user may speak a user input corresponding to "play [show title]" to a device not including a display. The system may determine a smart TV or other display device (associated with the same user profile) for outputting the show. Thus, the other data may represent the smart TV of other display device, and not the displayless device that captured the spoken user input.

The other data may also include data indicating the user input-receiving device's speed, location, or other mobility information. For example, the device 110 may correspond to a vehicle including a display. If the vehicle is moving, the skill shortlisting component 165 may decrease the confidence score associated with a skill component that generates video data, as it may be undesirable to output video content to a user while the user is driving.

The other data may also include data indicating a currently invoked skill component. For example, a user may speak a first (e.g., a previous) user input resulting in a music skill component outputting music to the user. As the system is outputting the music, the user may speak a second (e.g., the current) user input. The skill shortlisting component 165 may use such data to alter confidence scores of skill components. For example, the skill shortlisting component 165 may run a first model specific to a first skill component as well as a second model specific to a second skill component. Alternatively, the skill shortlisting component 165 may run a model configured to determine a score for each skill component. The skill shortlisting component 165 may also determine a same confidence score for each of the skill components in the first instance. The skill shortlisting component 165 may then alter the original confidence scores based on the first skill component outputting content while the current user input was received. Based on the first skill component being invoked, the skill shortlisting component 165 may (i) increase the confidence score associated with the first skill component while leaving the confidence score associated with the second skill component the same, (ii) leave the confidence score associated with the first skill component the same while decreasing the confidence score associated with the second skill component, or (iii) increase the confidence score associated with the first skill component as well as decrease the confidence score associated with the second skill component.

The thresholding implemented with respect to the n-best list if skill components generated by the skill shortlisting component 165 as well as the different types of other data considered by the skill shortlisting component 165 are configurable. For example, the skill shortlisting component 165 may update confidence scores as more other data is considered. For further example, the n-best list of skill components may exclude relevant skill components if thresholding is implemented. Thus, for example, the skill shortlisting component 165 may include an indication of a skill component in the n-best list of skill components unless the skill shortlisting component 165 is one hundred percent confident that the skill component may not execute the user input represented in the ASR output data (e.g., the skill shortlisting component 165 determines a confidence score of zero for the skill component).

The NLU component 160 processes the ASR output data to determine NLU output data including one or more NLU hypotheses, where each NLU hypothesis is associated with a respective skill component represented in the n-best list of skill components output by the skill shortlisting component 165. The NLU component 160 may perform intent classification (IC) processing on ASR output data to determine an intent of the user input. An intent corresponds to an action responsive to the user input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in the ASR output data to the words and phrases in an intents database. In some embodiments, the NLU component 160 may communicate with multiple intents databases, with each intents database corresponding to one or more intents associated with a particular skill component.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 160 may also perform named entity recognition (NER) processing on the ASR output data to determine one or more portions, sometimes referred to as slots or entities, of the user input that may be needed for post-NLU processing (e.g., processing performed by a skill component). For example, NER processing of the user input "play [song name]" may determine an entity type of "SongName" and an entity value corresponding to the indicated song name. For further example, NER processing of the user input "call mom" may determine an entity type of "Recipient" and an entity value corresponding to "mom." In another example, NER processing of the user input "what is today's weather" may determine an entity type of "Date" and an entity value of "today."

In some embodiments, the intents identifiable by the NLU component 160 may be linked to one or more grammar frameworks with entity types to be populated with entity values. Each entity type of a grammar framework corresponds to a portion of ASR output data that the NLU component 160 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRFs), and the like. For example, NER processing with respect to a music skill component may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill component, which IC processing determines corresponds to a <PlayMusic> intent.

The NLU component 160 may generate NLU output data including one or more NLU hypotheses, where each NLU hypothesis includes an intent and optionally one or more entity types and corresponding entity values. In some embodiments, a NLU hypothesis may be associated with a score representing a confidence of NLU processing performed to determine the NLU hypothesis with which the score is associated.

As described above, speech processing may be performed using two different components (e.g., the ASR component 150 and the NLU component 160). In some embodiments, a spoken language understanding (SLU) component configured to process audio data to determine NLU output data.

The SLU component may be equivalent to a combination of the ASR component 150 and the NLU component 160. Yet, the SLU component may process audio data and directly determine the NLU output data, without an intermediate step of generating ASR output data. As such, the SLU component may take audio data representing speech and attempt to make a semantic interpretation of the speech. That is, the SLU component may determine a meaning associated with the speech and then implement that meaning. For example, the SLU component may interpret audio data representing speech from the user 105 in order to derive a desired action. The SLU component may output NLU output data including a most likely NLU hypothesis, or multiple NLU hypotheses associated with respective confidence or other scores (such as probability scores, etc.).

The profile storage 170 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components 190 that the user has enabled. When a user enables a skill component, the user is providing permission to allow the skill component to execute with respect to the user's inputs. If a user does not enable a skill component, the skill component may be prevented from processing with respect to the user's inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The skill component selection component 185 is configured to determine a skill component, to execute to respond to the user input, based on the NLU output data determined by the NLU component 160 for the user input. The skill component selection component 185 may include a skill component proposal component, a skill component pre-response component, and a skill component ranking component.

The skill component proposal component is configured to determine skill components capable of processing in response to the user input. In addition to receiving the NLU output data, the skill component proposal component may also receive context data corresponding to the user input. For example, the context data may indicate a skill component that was causing the device 110 to output content (e.g., music, video, synthesized speech, etc.) when the device 110 captured the user input, one or more skill components that are indicated as enabled in a profile (as stored in the profile storage 170) associated with the user 105, output capabilities (which may be represented as a device type identifier) of the device 110, a geographic location of the device 110, and/or other context data corresponding to the user input.

The skill component proposal component may implement skill component proposal rules. A skill component developer (via a skill component developer device) may provide one or more rules representing when the skill component developer's skill component should be invoked to respond to a user input. In some embodiments, such a rule may be specific to an intent. In such embodiments, if a skill component is configured to execute with respect to multiple intents, the skill component may be associated with more than one rule (e.g., each rule corresponding to a different intent capable of being handled by the skill component). In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary (e.g., yes/no, true/false, etc.) determinations regarding whether a skill component is configured to process in response to the user input. For example, the skill component proposal component may determine a skill component is configured to process, in response to the user input, if the skill component is associated with a rule corresponding to the intent (represented in the NLU output data) and the context data.

In some embodiments, the skill component proposal component may make such binary determinations with respect to all skill components. In some embodiments, the skill component proposal component may make the binary determinations with respect to only a portion of the skill components (e.g., only skill components indicated as enabled in the user profile of the user 105).

After the skill component proposal component is finished processing, the skill component pre-response component is called to execute. The skill component pre-response component is configured to query skill components, determined by the skill component proposal component as configured to process the user input, as to whether the skill components are in fact able to respond to the user input. The skill component pre-response component may take as input the NLU output data (input to the skill component selection component 185) including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis (associated with the skill component) and optionally other context data corresponding to the user input (e.g., device type of the device 110).

A skill component may determine, based on a received pre-response query (and optionally other data available to the skill component), whether the skill component is capable of respond to the user input. For example, a skill component may generate a pre-response indicating the skill component can respond to the user input, indicating the skill component may be able to respond to the user input (e.g., the indicating the skill component needs more data to determine whether the skill component can respond to the user input), or indicating the skill component cannot respond to the user input (e.g., due to a present processing load of the skill component).

In situations where a skill component's pre-response indicates the skill component 190 can or may be able to respond to the user input, the skill component's pre-response may also include various other data representing a strength of the skill component's potential response to the user input. Such other data may positively influence the skill component's ranking by the skill component ranking component of the skill component selection component 185. For example, such other data may indicate capabilities (e.g., output capabilities or components such as a connected screen, loudspeaker, etc.) of a device to be used to output the skill component's response; pricing data corresponding to a product or service the user input is requesting be purchased (or is requesting information for); availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator (e.g., a flag) representing a strength of the skill component's ability to personalize its response to the user input.

In some embodiments, a skill component's pre-response may be configured to a pre-defined schema. By requiring pre-responses to conform to a specific schema (e.g., by requiring skill components to only be able to provide certain types of data in pre-responses), new skill components may be onboarded into the skill component selection functionality described herein without needing to reconfigure the skill component selection component 185 each time a new skill component is onboarded. Moreover, requiring pre-responses to conform to a schema limits the amount of values needed to be used to train and implement a machine learning model for ranking skill components.

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implemented a ML model. In some embodiments, the ML model may be a deep neural network (DNN).

The skill component ranking component may take as input the NLU output data determined by the NLU component 160 and input to the skill component selection component 185, the skill component pre-responses received by the skill component pre-response component, one or more preferences (e.g., skill component preferences) of the user 105 (as represented in a user profile or group profile stored in the profile storage 170), NLU confidence scores of the NLU output data (as determined by the NLU component 160), a device type of the device 110, data indicating whether the device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response (to the user input) that is personalized to the user 105, that a NLU hypothesis corresponding to the skill component is associated with a NLU confidence score satisfying (e.g., meeting or exceeding) a condition (e.g., a threshold NLU confidence score), that the skill component was outputting content via the device 110 when the device 110 received the user input, etc. Things that may decrease a skill component's ranking include, for example, that the skill component is associated with a pre-response indicating the skill component cannot generate a response (to the user input) that is personalized to the user 105, that a NLU hypothesis corresponding to the skill component is associated with a NLU confidence score failing to satisfy (e.g., failing to meet or exceed) a condition (e.g., a threshold NLU confidence score), etc.

The skill component ranking component may generate a score for each skill component determined by the skill component proposal component, where the score represents a strength with which the skill component ranking component recommends the associated skill component is to execute to respond to the user input. Such a confidence score may be a numeric score (e.g., between 0 and 1) or a binned score (e.g., low, medium, high). The skill component ranking component may output a single skill component selection hypothesis, indicating the top ranked skill component and its corresponding NLU hypothesis, to the orchestrator component 130.

As used herein, a "skill component" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill component may be called to output music sung by the indicated artist. For further example, for NLU output data including a <TurnOn> intent, a "device" entity type, and an entity value of "lights," a smart home skill component may be called to cause one or more "smart" lights to operate in an "on" state. In another example, for NLU output data including an <OutputWeather> intent, a "location" entity type, and an entity value corresponding to a geographic location of the device 110, a weather skill component may be called to output weather information for the geographic location. For further example, for NLU output data including a <BookRide> intent, a taxi skill component may be called to book a requested ride. In another example, for NLU output data including a <BuyPizza> intent, a restaurant skill component may be called to place an order for a pizza.

A skill component may operate in conjunction between the device 110/system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

Figure 5:
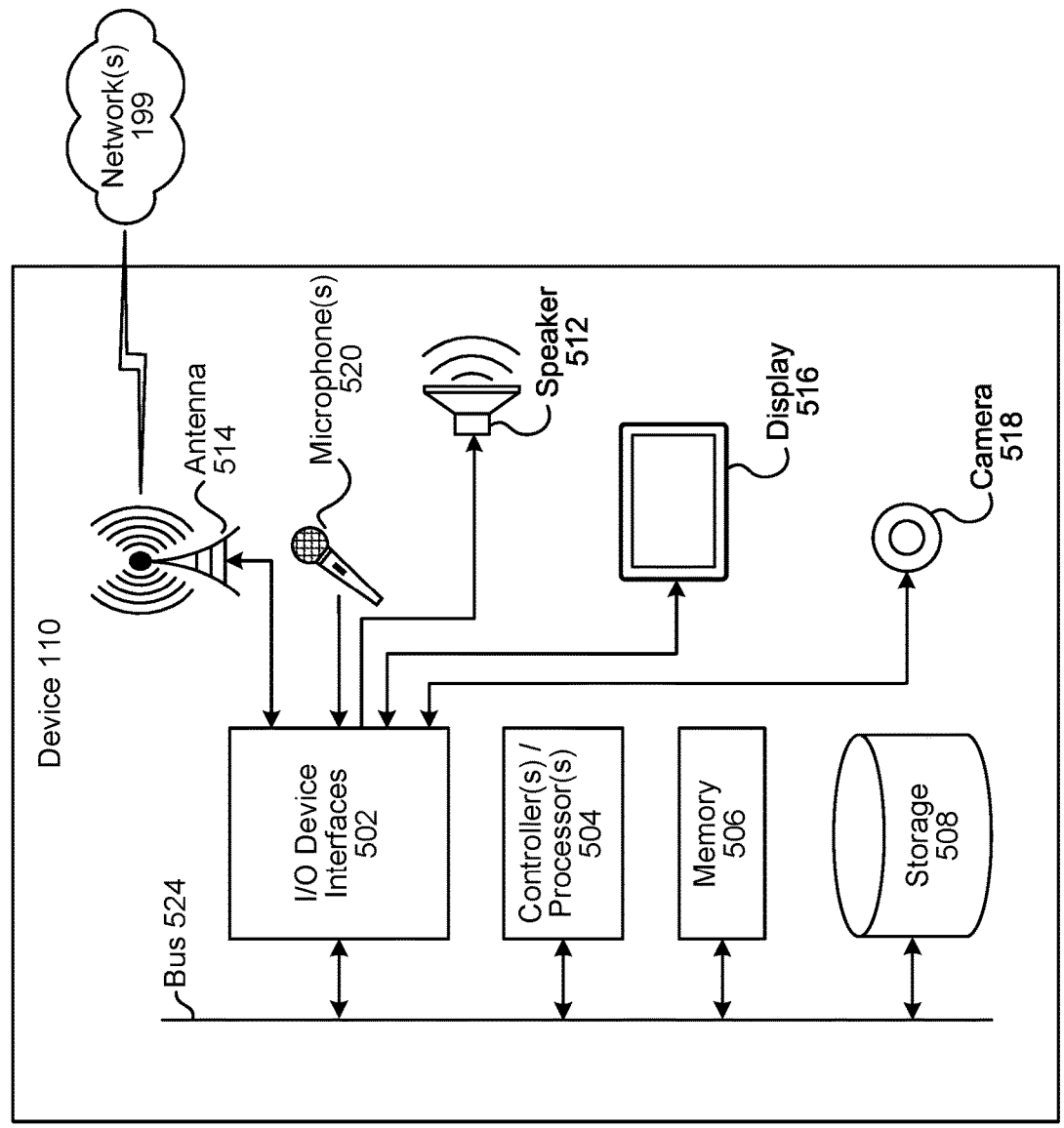
FIG. 5 is a block diagram conceptually illustrating example components of a device, according to embodiments of the present disclosure.
Figure 6:
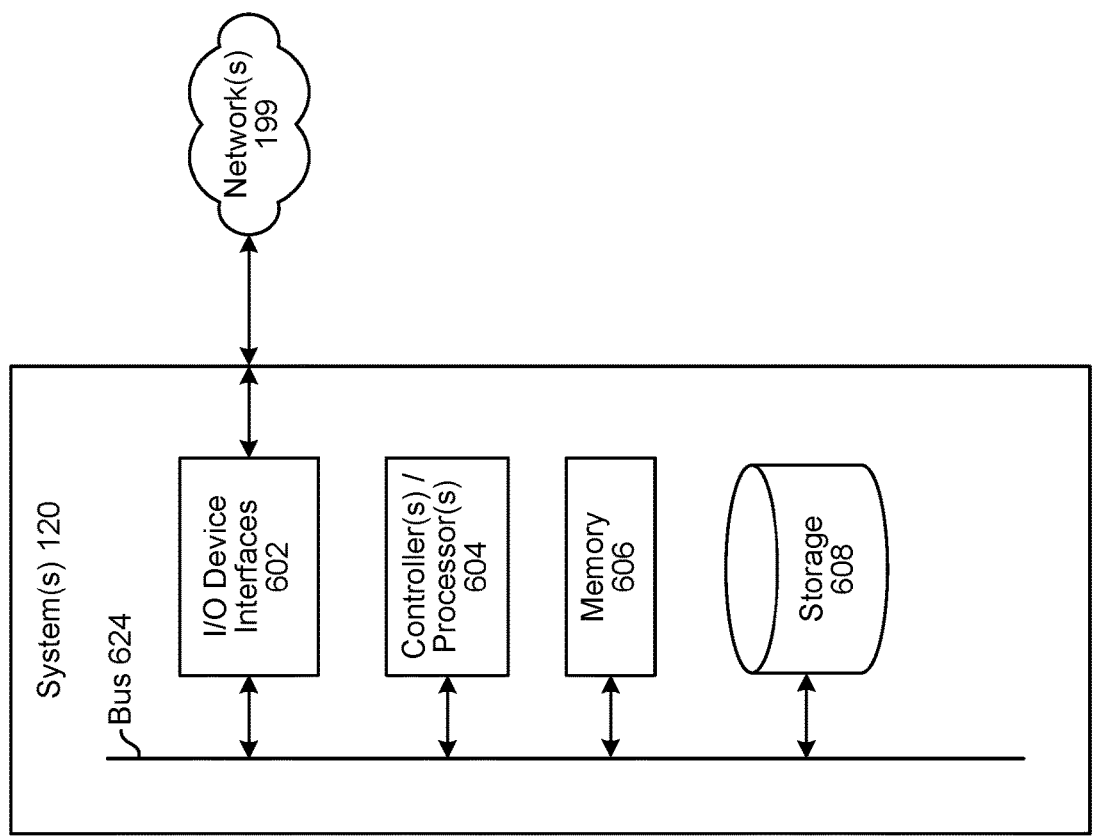
FIG. 6 is a block diagram conceptually illustrating example components of a system, according to embodiments of the present disclosure.

FIG. 5 is a block diagram conceptually illustrating a device 110 that may be used with the system 120. FIG. 6 is a block diagram conceptually illustrating example components of a remote device, such as the system 120, which may assist with ASR processing, NLU processing, etc.; and a skill component. The system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems 120 may be included in the system 100 of the present disclosure, such as one or more systems 120 for performing ASR processing, one or more systems 120 for performing NLU processing, and one or more skill components, etc. In operation, each of these systems may include computer-readable and computer-executable instructions that reside on the respective system 120, as will be discussed further below.

Each of these devices (110/120) may include one or more controllers/processors (504/604), which may each include a central processing unit (CPU) for processing data and computer-readable instructions, and a memory (506/606) for storing data and instructions of the respective device. The memories (506/606) may individually include volatile random access memory (RAM), non-volatile read only memory (ROM), non-volatile magnetoresistive memory (MRAM), and/or other types of memory. Each device (110/120) may also include a data storage component (508/608) for storing data and controller/processor-executable instructions. Each data storage component (508/608) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (502/602).

Computer instructions for operating each device (110/120) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120) includes input/output device interfaces (502/602). A variety of components may be connected through the input/output device interfaces (502/602), as will be discussed further below. Additionally, each device (110/120) may include an address/data bus (524/624) for conveying data among components of the respective device. Each component within a device (110/120) may also be directly connected to other components in addition to (or instead of) being connected to other components across the bus (524/624).

Referring to FIG. 5, the device 110 may include input/output device interfaces 502 that connect to a variety of components such as an audio output component such as a speaker 512, a wired headset or a wireless headset (not illustrated), or other component capable of outputting audio. The device 110 may also include an audio capture component. The audio capture component may be, for example, a microphone 520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 516 for displaying content. The device 110 may further include a camera 518.

Via antenna(s) 514, the input/output device interfaces 502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (502/602) may also include communication components that allow data to be exchanged between devices such as different physical servers in a collection of servers or other components.

The components of the device 110, the system 120, and/or a skill component may include their own dedicated processors, memory, and/or storage. Alternatively, one or more of the components of the device 110, the system 120, and/or a skill component may utilize the I/O interfaces (502/602), processor(s) (504/604), memory (506/606), and/or storage (508/608) of the device(s) 110, system 120, or the skill component, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill component, as described herein, are illustrative, and may be located as a stand-alone device or may be included, in whole or in part, as a component of a larger device or system.

Figure 7:
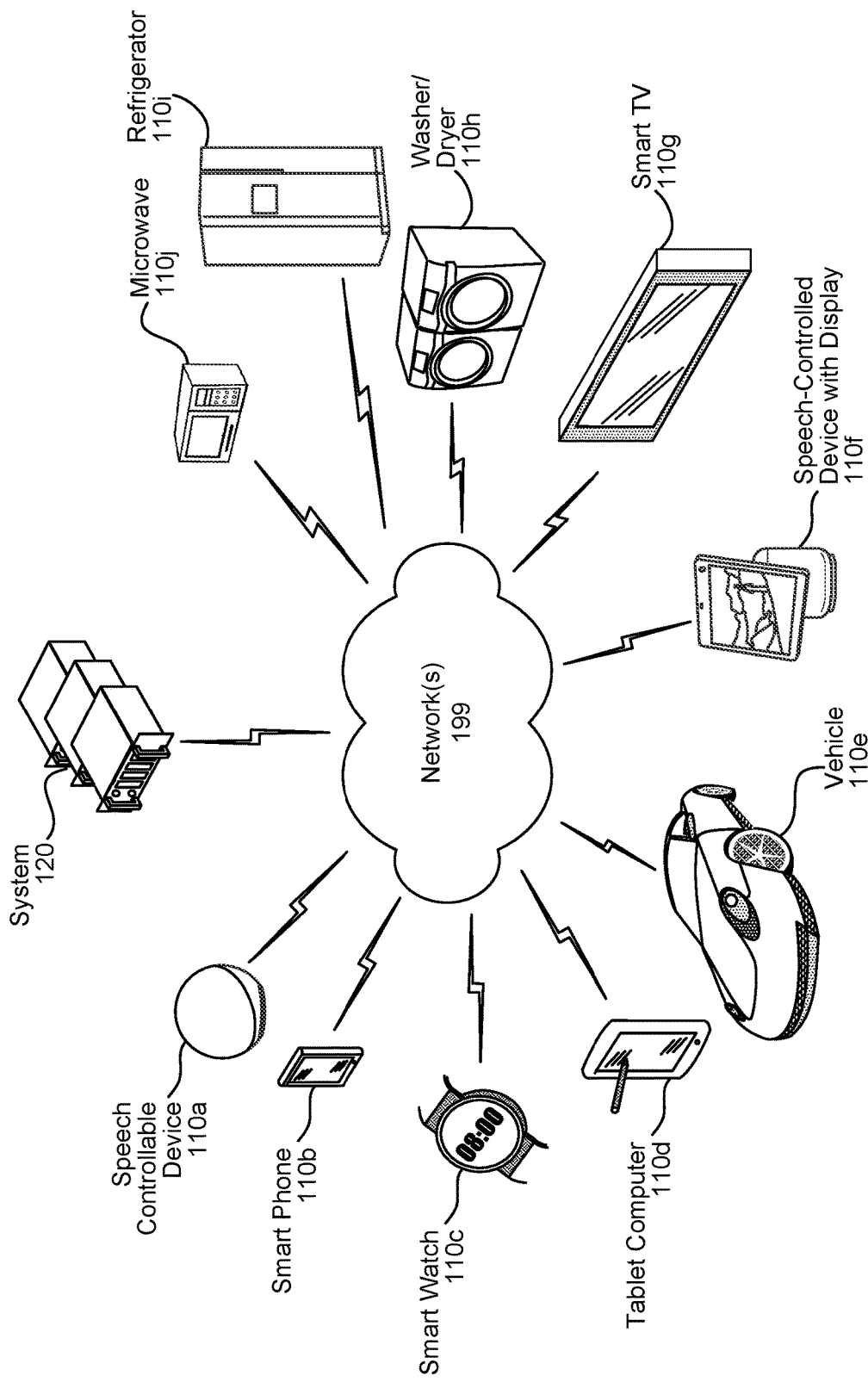
FIG. 7 illustrates an example of a computer network for use with the overall system, according to embodiments of the present disclosure.

As illustrated in FIG. 7, multiple devices (110*a*-110*j*, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110*a*, a smart phone 110*b*, a smart watch 110*c*, a tablet computer 110*d*, a vehicle 110*e*, a speech-controlled device 110*f* with a display, a smart television 110*g*, a washer/dryer 110*h*, a refrigerator 110*i*, and/or a microwave 110*j* may be connected to the network(s) 199 through a wireless service provider, over a WiFi or cellular network connection, or the like. Other devices are included as network-connected support devices, such as the system 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill component in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, by a device, audio data corresponding to a first spoken user input;
generating, using the audio data, a first vector representing first speech characteristics of the first spoken user input, the first vector comprising a first plurality of values including at least a first value and a second value;
identifying a second vector associated with the device and a first user profile identifier, the second vector representing second speech characteristics of a first user corresponding to the first user profile identifier, the second vector comprising a second plurality of values;
identifying a third vector associated with the device and a second user profile identifier, the third vector representing third speech characteristics of a second user corresponding to the second user profile identifier, the third vector comprising a third plurality of values;
determining a machine learning (ML) model corresponding to a group of users associated with the device, the ML model being configured using at least:
a first positive sample comprising a fourth vector representing a second spoken user input associated with the first user profile identifier and a fifth vector representing a third spoken user input associated with the first user profile identifier,
a second positive sample comprising a sixth vector representing a fourth spoken user input associated with the second user profile identifier and a seventh vector representing a fifth spoken user input associated with the second user profile identifier, and
a negative sample comprising the fourth vector and the sixth vector;
processing, using the ML model, the first vector to generate an eighth vector representing a portion of the first speech characteristics, the eighth vector comprising a fourth plurality of values including the first value and excluding the second value, the fourth plurality of values comprising fewer values than the first plurality of values;
processing, using the ML model, the second vector to generate a ninth vector representing a portion of the second speech characteristics, the ninth vector comprising a fifth plurality of values comprising fewer values than the second plurality of values;
processing, using the ML model, the third vector to generate a tenth vector representing a portion of the third speech characteristics, the tenth vector comprising a sixth plurality of values comprising fewer values than the third plurality of values;
determining a first score representing a similarity between the eighth vector and the ninth vector;
determining a second score representing a similarity between the eighth vector and the tenth vector;
determining, based at least in part on the first score and the second score, that the first spoken user input corresponds to the first user profile identifier; and
determining, using the first user profile identifier, output data responsive to the first spoken user input.

2. The computer-implemented method of claim 1, further comprising:
determining a third score representing a similarity between the first vector and the second vector;
determining a fourth score corresponding to a logistic regression of the first score and the third score; and
determining that the first spoken user input corresponds to the first user profile identifier further based on the fourth score.

3. The computer-implemented method of claim 2, further comprising:
determining the first score to represent a Euclidean distance between the eighth vector and the ninth vector; and
determining the third score to represent a cosine similarity between the first vector and the second vector.

4. The computer-implemented method of claim 1, further comprising determining the first positive sample to comprise:
the fourth vector to represent the second spoken user input to be a prompted user input received during a voice-based user recognition enrollment process; and
the fifth vector to represent the third spoken user input to be determined by a voice-based user recognition component to be associated with the first user profile identifier at runtime.

5. A computer-implemented method, comprising:
receiving audio data corresponding to a first spoken user input;
generating first embedding data representing first speech characteristics of the first spoken user input, the first embedding data including at least a first value and a second value;
identifying second embedding data associated with a first user profile identifier, the second embedding data representing second speech characteristics of a first user corresponding to the first user profile identifier;
processing, using a machine learning (ML) model corresponding to a group of users, the first embedding data to generate third embedding data representing a portion of the first speech characteristics, the third embedding data including the first value and excluding the second value, the ML model being configured using at least:
a first sample comprising fourth embedding data representing a second spoken user input associated with the first user profile identifier, and
a second sample comprising fifth embedding data representing a third spoken user input associated with a second user profile identifier;
processing, using the ML model, the second embedding data to generate sixth embedding data representing a portion of the second speech characteristics;
determining first data representing a first similarity between the third embedding data and the sixth embedding data;
determining, based at least in part on the first data, that the first spoken user input corresponds to the first user profile identifier; and
determining, using the first user profile identifier, output data responsive to the first spoken user input.

6. The computer-implemented method of claim 5, wherein the second spoken user input is a prompted user input received during a voice-based user recognition enrollment process.

7. The computer-implemented method of claim 5, wherein at least one of the first user profile identifier and the second user profile identifier is associated with a device, and wherein the computer-implemented method further comprises:

receiving a fourth spoken user input, wherein the fourth spoken user input is unassociated with any user profile identifier associated with the device;

receiving a fifth spoken user input, wherein the fifth spoken user input is unassociated with any user profile identifier associated with the device;

determining seventh embedding data representing third speech characteristics of the fourth spoken user input;

determining eighth embedding data representing fourth speech characteristics of the fifth spoken user input;

determining the third speech characteristics correspond to the fourth speech characteristics; and based at least in part on the third speech characteristics corresponding to the fourth speech characteristics, configuring the ML model further using the seventh embedding data and the eighth embedding data.

8. The computer-implemented method of claim 5, wherein at least one of the first user profile identifier and the second user profile identifier is associated with a device, and wherein the computer-implemented method further comprises:

receiving a request to associate a third user profile identifier with the device;

determining seventh embedding data associated with the third user profile identifier, the seventh embedding data representing third speech characteristics of a fourth spoken user input; and configuring the ML model further using the seventh embedding data.

9. The computer-implemented method of claim 5, further comprising:

determining seventh embedding data including a plurality of values representing third speech characteristics of the second spoken user input, wherein the seventh embedding data comprises the plurality of values with a portion of the plurality of values masked.

10. The computer-implemented method of claim 5, further comprising:

determining second data representing a second similarity between the first embedding data and the second embedding data;

determining third data based at least in part on the first similarity and the second similarity; and determining that the first spoken user input corresponds to the first user profile identifier further based at least in part on the third data.

11. The computer-implemented method of claim 10, wherein:

the first data represents a Euclidean distance between the third embedding data and the sixth embedding data; and the second data represents a cosine similarity between the first embedding data and the second embedding data.

12. The computer-implemented method of claim 10, further comprising:

determining the third data to correspond to a logistic regression of the first data and the second data.

13. The computer-implemented method of claim 5, wherein:

the third embedding data includes fewer values that the first embedding data.

14. A computing system comprising:

at least one processor; and at least one memory comprising instructions that, when executed by the at least one processor, cause the computing system to:

receiving audio data corresponding to a first spoken user input;

generating first embedding data representing first speech characteristics of the first spoken user input, the first embedding data including at least a first value and a second value;

identifying second embedding data associated with and a first user profile identifier, the second embedding data representing second speech characteristics of a first user corresponding to the first user profile identifier;

processing, using a machine learning (ML) model corresponding to a group of users, the first embedding data to generate third embedding data representing a portion of the first speech characteristics, the third embedding data including the first value and excluding the second value, the ML model being configured using at least:

a first sample comprising fourth embedding data representing a second spoken user input associated with the first user profile identifier, and a second sample comprising fifth embedding data representing a third spoken user input associated with a second user profile identifier;

processing, using the ML model, the second embedding data to generate sixth embedding data representing a portion of the second speech characteristics;

determining first data representing a first similarity between the third embedding data and the sixth embedding data;

determining, based at least in part on the first data, that the first spoken user input corresponds to the first user profile identifier; and determining, using the first user profile identifier, output data responsive to the first spoken user input.

15. The computing system of claim 14, wherein the second spoken user input is a prompted user input received during a voice-based user recognition enrollment process.

16. The computing system of claim 14, wherein at least one of the first user profile identifier and the second user profile identifier is associated with a device, and wherein the at least one memory further comprises instructions that, when executed by the at least one processor, further cause the computing system to:

receive a fourth spoken user input, wherein the fourth spoken user input is unassociated with any user profile identifier associated with the device;

receive a fifth spoken user input, wherein the fifth spoken user input is unassociated with any user profile identifier associated with the device;

determine seventh embedding data representing third speech characteristics of the fourth spoken user input;

determine eighth embedding data representing fourth speech characteristics of the fifth spoken user input;

determine the third speech characteristics correspond to the fourth speech characteristics; and based at least in part on the third speech characteristics corresponding to the fourth speech characteristics, configure the ML model further using the seventh embedding data and the eighth embedding data.

17. The computing system of claim 14, wherein at least one of the first user profile identifier and the second user profile identifier is associated with a device, and wherein the at least one memory further comprises instructions that, when executed by the at least one processor, further cause the computing system to:

receive a request to associate a third user profile identifier with the device;

determine seventh embedding data associated with the third user profile identifier, the seventh embedding data representing third speech characteristics of a fourth spoken user input; and configure the ML model further using the seventh embedding data.

18. The computing system of claim 14, wherein the at least one memory further comprises instructions that, when executed by the at least one processor, further cause the computing system to:

determine seventh embedding data including a plurality of values representing third speech characteristics of the second spoken user input, wherein the seventh embedding data comprises the plurality of values with a portion of the plurality of values masked.

19. The computing system of claim 14, wherein the at least one memory further comprises instructions that, when executed by the at least one processor, further cause the computing system to:

determine second data representing a second similarity between the first embedding data and the second embedding data;

determine third data based at least in part on the first similarity and the second similarity; and determine that the first spoken user input corresponds to the first user profile identifier further based at least in part on the third data.

20. The computing system of claim 19, wherein:

the first data represents a Euclidean distance between the third embedding data and the sixth embedding data; and the second data represents a cosine similarity between the first embedding data and the second embedding data.

21. The computing system of claim 19, wherein the at least one memory further comprises instructions that, when executed by the at least one processor, further cause the computing system to:

determine the third data to correspond to a logistic regression of the first data and the second data.

22. The computing system of claim 14, wherein:

the third embedding data includes fewer values that the first embedding data.

* * * * *